(12) United States Patent
Hoang et al.

(10) Patent No.: US 11,681,911 B2
(45) Date of Patent: Jun. 20, 2023

(54) METHOD AND SYSTEM FOR TRAINING NEURAL SEQUENCE-TO-SEQUENCE MODELS BY INCORPORATING GLOBAL FEATURES

(71) Applicant: NAVER CORPORATION, Seongnam-si (KR)

(72) Inventors: Vu Cong Duy Hoang, Brunswick West (AU); Ioan Calapodescu, Grenoble (FR); Marc Dymetman, Grenoble (FR)

(73) Assignee: NAVER CORPORATION, Seongnam-si (KR)

( * ) Notice: Subject to any disclaimer, the term of this patent is extended or adjusted under 35 U.S.C. 154(b) by 667 days.

(21) Appl. No.: 16/653,427

(22) Filed: Oct. 15, 2019

(65) Prior Publication Data

US 2021/0110254 A1 Apr. 15, 2021

(51) Int. Cl.
*G06N 3/08* (2023.01)
*G06F 17/18* (2006.01)
*G06F 40/30* (2020.01)
*G06N 3/04* (2023.01)
*G06F 40/58* (2020.01)

(52) U.S. Cl.
CPC .............. *G06N 3/08* (2013.01); *G06F 17/18* (2013.01); *G06F 40/30* (2020.01); *G06F 40/58* (2020.01)

(58) Field of Classification Search
CPC ........ G06N 3/0454; G06N 3/08; G06N 3/006; G06N 3/0445; G06N 3/04; G06N 3/084; G06N 20/00; G10L 15/063; G06F 40/30; G06F 40/242; G06F 40/284; G06F 40/40; G06F 40/216; G06F 17/18; G06K 9/6256; G06K 9/6257; G06K 9/6262; G06K 9/6269

USPC ........ 706/12, 13, 15, 16, 17, 18, 19, 20, 21, 706/24, 25, 30, 31, 34, 37, 38, 41, 42, 43, 706/55, 62; 704/1, 2, 7, 9, 10
See application file for complete search history.

(56) References Cited

U.S. PATENT DOCUMENTS 9,830,315 B1 * 11/2017 Xiao ....................... G06F 40/30
10,281,885 B1 * 5/2019 Chiu ................... G06N 3/0445
(Continued)

OTHER PUBLICATIONS

Sutskever et al., "Sequence to Sequence Learning with Neural Networks", Advances in Neural Information Processing Systems 27, p. 1-9, IDS. (Year: 2014).*

(Continued)

*Primary Examiner* — Leshui Zhang
(74) *Attorney, Agent, or Firm* — Greer, Burns & Crain, Ltd.

(57) ABSTRACT

Methods for training a neural sequence-to-sequence (seq2seq) model. A processor receives the model and training data comprising a plurality of training source sequences and corresponding training target sequences, and generates corresponding predicted target sequences. Model parameters are updated based on a comparison of predicted target sequences to training target sequences to reduce or minimize both a local loss in the predicted target sequences and an expected loss of one or more global or semantic features or constraints between the predicted target sequences and the training target sequences given the training source sequences. Expected loss is based on global or semantic features or constraints of general target sequences given general source sequences.

24 Claims, 5 Drawing Sheets

(56) References Cited

U.S. PATENT DOCUMENTS

| | | | | |
|---|---|---|---|---|
| 2016/0098632 | A1* | 4/2016 | Sutskever | G06N 3/0445 706/25 |
| 2017/0148431 | A1* | 5/2017 | Catanzaro | G10L 25/21 |
| 2017/0316775 | A1* | 11/2017 | Le | G06F 16/3329 |
| 2017/0323636 | A1* | 11/2017 | Xiao | G06F 16/332 |
| 2018/0107925 | A1* | 4/2018 | Choi | G06N 3/082 |
| 2018/0203852 | A1* | 7/2018 | Goyal | G06N 3/006 |
| 2018/0247643 | A1* | 8/2018 | Battenberg | G10L 15/16 |
| 2020/0175374 | A1* | 6/2020 | Hestness | G06N 3/0445 |

OTHER PUBLICATIONS

Ranzato et al., "Sequence Level Training with Recurrent Neural Networks", ICLR, Nov. 20, p. 1-16, IDS (Year: 2015).*

Ravuri et al., "Learning Implicit Generative Models with the Method of Learned Moments", Proceedings of the 35th International Conference on Machine Learning, Stockholm, Sweden, PMLR 80, p. 1-10, IDS (Year: 2018).*

Agarwal, et al., "A Surprisingly Effective Out-of-the-Box Char2char Model on the E2E NLG Challenge Dataset," Proceedings of the SIGDIAL Conference, 2017, pp. 158-163.

Barana, O., Book Review of "Reinforcement Learning: An Introduction," IEEE Transactions on Neural Networks, Jan. 2005, vol. 16, No. 1, pp. 285-286.

Bahdanau, et al., "Neural Machine Translation by Jointly Learning to Align and Translate," ICLR, Sep. 1, 2014, 15 pages.

He, et al., "Decoding with Value Networks for Neural Machine Translation," in Advances in Neural Information Processing Systems 30, NIPS, 2016, Barcelona, Spain, 9 pages.

He, et al., "Dual Learning for Machine Translation," Advances in Neural Information Processing Systems 29, NIPS, 2017, Long Beach, California, 10 pages.

Hoang, V., "On the Use of Prior and External Knowledge in Neural Sequence Models," PhD Completion Seminar, University of Melbourne, Australia, Oct. 23, 2018, 85 pages.

Hoang, et al., "Moment Matching Training for Neural Machine Translation: A Preliminary Study," Dec. 24, 2018, 14 pages.

Hoang, et al., "Moment Matching Training for Neural Machine Translation: A Preliminary Study," Revised Paper, Dec. 28, 2018, 14 pages.

Hoang, V., On the Use of Prior and External Knowledge in Neural Sequence Models, Dissertation, Melbourne School of Engineering, The University of Melbourne, Jul. 2019, 239 pages.

Koehn, P., "Statistical Significance Tests for Machine Translation Evaluation," Proceedings of the 2004 Conference on Empirical Methods in Natural Language Processing, 2004, Barcelona, Spain: Association for Computational Linguistics, pp. 388-395.

Li, et al., "MMD GAN: Towards Deeper Understanding of Moment Matching Network," Advances in Neural Information Processing Systems 30, NIPS, 2017, Long Beach, California, 11 pages.

Li, et al., "Generative Moment Matching Networks," Proceedings of the 32nd International Conference on Machine Learning, 2015, Lille, France, 10 pages.

Lin, C., "ROUGE: A Package for Automatic Evaluation of Summaries," Proceedings of Workshop on Text Summarization Branches Out, ACL, 2004, Barcelona, Spain, 10 pages.

Lipton, et al., "A Critical Review of Recurrent Neural Networks for Sequence Learning," May 29, 2015, 38 pages.

Papineni, et al., "BLEU: A Method for Automatic Evaluation of Machine Translation," Proceedings of the 40th Annual Meeting on Association for Computational Linguistics (ACL), 2002, Philadelphia, Pennsylvania: Association for Computational Linguistics, pp. 311-318.

Ranzato, et al. "Sequence Level Training with Recurrent Neural Networks," ICLR, Nov. 20, 2015, 16 pages.

Ravuri, et al., "Learning Implicit Generative Models with the Method of Learned Moments," Proceedings of the 35th International Conference on Machine Learning, 2018, Stockholm, Sweden, 10 pages.

Sutskever, et al., "Sequence to Sequence Learning with Neural Networks," Advances in Neural Information Processing Systems 27, 2014, 9 pages.

Sutton, et al.,"Policy Gradient Methods for Reinforcement Learning with Function Approximation," Advances in Neural Information Processing Systems 12, MIT Press, 2000, pp. 1057-1063.

Vaswani, et al., "Attention Is All You Need," Advances in Neural Information Processing Systems 30, NIPS, 2017, 11 pages.

Zhang, et al., "Prior Knowledge Integration for Neural Machine Translation Using Posterior Regularization," Proceedings of the 55th Annual Meeting of the Association for Computational Linguistics, 2017, Vancouver, Canada: Association for Computational Linguistics, pp. 1514-1523.

* cited by examiner

METHOD AND SYSTEM FOR TRAINING NEURAL SEQUENCE-TO-SEQUENCE MODELS BY INCORPORATING GLOBAL FEATURES

TECHNICAL FIELD

This invention relates generally to methods and systems for machine learning. Particular example embodiments of the invention are applicable to training and using neural sequence-to-sequence (seq2seq) models.

BACKGROUND

Neural sequence-to-sequence (seq2seq) models are useful in various applications that involve producing one or more output sequences from one or more input sequences. Seq2seq models can be classified, for instance, by a ratio between the numbers of source sequences input to the model and associated target sequences output from the model; e.g., one-to-one, one-to-many, or many-to-one.

In an example framework including a seq2seq model, a source sequence, which is a sequence of tokens usually represented by (e.g., embedded or encoded in) a sequence of vectors, is introduced to a neural mechanism, such as a neural network implemented by a processor and memory and having one or more layers. The source sequences can represent any of various types of inputs for which a corresponding output sequence of tokens is desired.

The neural mechanism executes the neural seq2seq model, which includes layers that sequentially process the source sequence over one or more hidden states using an activation function and a set of model parameters including weights, resulting in an intermediate state. Additional layers then process at least this intermediate state to produce a sequential output (e.g., a next token in a sequence) using an activation function and one or more model parameters including weights. A final output of the neural mechanism executing the neural seq2seq model (for example, after generating an end-of-sequence (EOS) token) is a complete generated, or predicted, target sequence that corresponds to the source sequence.

To improve the effectiveness of the neural mechanism to produce useful predicted target sequences, the neural seq2seq model can be trained using a set of existing training data. Training data can be obtained, for instance, from a training corpus stored in a database. A set of training data for training a seq2seq model typically includes corresponding tuples (e.g., pairs) of known source sequences and corresponding target sequences.

The source sequences are input to the seq2seq model to be trained, which generates corresponding predicted target sequences. The predicted, or model, target sequence is compared to the known, or empirical, target sequence, and the model parameters (e.g., weights) of the seq2seq model are updated by the processor based on the execution of an optimization algorithm After training, the neural seq2seq model can be validated and/or tested by inputting additional testing source sequences to assess its effectiveness in generating predicted target sequences. The trained and preferably validated neural seq2seq model can then be used for inference, that is, to generate new predicted target sequences in response to receiving unknown source sequences in various applications.

It is desired to provide additional methods and systems for training neural seq2seq methods to further improve their effectiveness.

SUMMARY

Embodiments of the invention provide, among other things, methods for training a neural sequence-to-sequence (seq2seq) model using a processor. The seq2seq model is configured to receive an input source sequence and output a predicted target sequence based on one or more model parameters. In example methods, the processor receives the model and training data, where the training data comprises a plurality of training source sequences and a corresponding plurality of training target sequences. The processor generates, using the seq2seq model, a plurality of predicted target sequences corresponding to the plurality of training source sequences. The model parameters are updated by the processor based on a comparison of the generated plurality of predicted target sequences to the corresponding plurality of training target sequences to reduce or minimize a local loss in the predicted target sequences and to minimize or reduce an expected loss of one or more global or semantic features or constraints between the predicted target sequences and the training target sequences given the training source sequences. The expected loss is based on one or more global or semantic features or constraints of general target sequences given general source sequences. The processor saves the updated model parameters for the seq2seq model in a memory to provide the trained seq2seq model.

Other embodiments of the invention provide, among other things, methods for training a pretrained neural sequence-to-sequence (seq2seq) model using a processor. The seq2seq model is configured to receive an input source sequence and output a predicted target sequence based on one or more model parameters. The processor receives the pretrained model and stored parallel training data, where the training data comprises a plurality of training source sequences and a corresponding plurality of training target sequences. The processor performs, for each of a plurality of iterations 1, . . . , M:

selecting a batch of the plurality of training source sequences and corresponding training target sequences;

randomly sampling a plurality of generated predicted target sequences for the selected batch of source sequences using the pretrained model (for iteration 1) or using a model updated in a preceding iteration (for iterations 2, . . . , M);

in each of a first set of iterations between 1 and M:

computing, by the processor, total moment matching gradients over the selected batch using the randomly sampled plurality of generated predicted target sequences and the selected batch of corresponding training target sequences, wherein the computing comprises determining a distance between expectations of one or more global features or constraints over the randomly sampled plurality of generated predicted target sequences and over the selected batch of corresponding training target sequences, the one or more global features or constraints being represented by one or more conditional feature functions; and updating, by the processor, the model parameters for the selected batch using gradient descent (GD) based on the computed total moment matching gradients to update the seq2seq model; and in each of a second set of iterations between 1 and M alternating with the first set of iterations:
  computing, by the processor, cross-entropy-based (CE-based) based gradients for the selected batch using the randomly sampled plurality of generated predicted target sequences and the selected batch of corresponding training target sequences; and
  updating, by the processor, the model parameters for the selected batch using gradient descent (GD) based on the computed CE-based gradients to update the seq2seq model; and
after performing iterations 1, . . . , M, saving in a memory the updated model parameters for the seq2seq model with respect to a best score based on minimizing an approximation of the moment matching loss over at least a portion of the training data, to provide the trained seq2seq model.

Other embodiments of the invention provide, among other things, methods for generating a target sequence from a source sequence. The source sequence is received, and a trained neural sequence-to-sequence model configured to receive the received source sequence and output the target sequence based on one or more model parameters is accessed in a memory. The target sequence corresponding to the received source sequence is generated using the trained neural sequence-to-sequence model, and the generated target sequence is output. The trained neural sequence-to-sequence model is trained using a processor that: receives a neural sequence-to-sequence (seq2seq) model and training data, where the training data comprises a plurality of training source sequences and a corresponding plurality of training target sequences; generates, using the seq2seq model, a plurality of predicted target sequences corresponding to the plurality of training source sequences; updates the model parameters based on a comparison of the generated plurality of predicted target sequences to the corresponding plurality of training target sequences to reduce or minimize a local loss in the predicted target sequences and to minimize or reduce an expected loss of one or more global or semantic features or constraints between the predicted target sequences and the training target sequences given the training source sequences, where the expected loss is based on one or more global or semantic features or constraints of general target sequences given general source sequences; and saves in the memory the updated model parameters for the seq2seq model to provide the trained neural sequence-to-sequence model.

Example apparatuses, systems, and processes for performing such example methods and other example methods are also provided herein.

DETAILED DESCRIPTION

Figure 1:
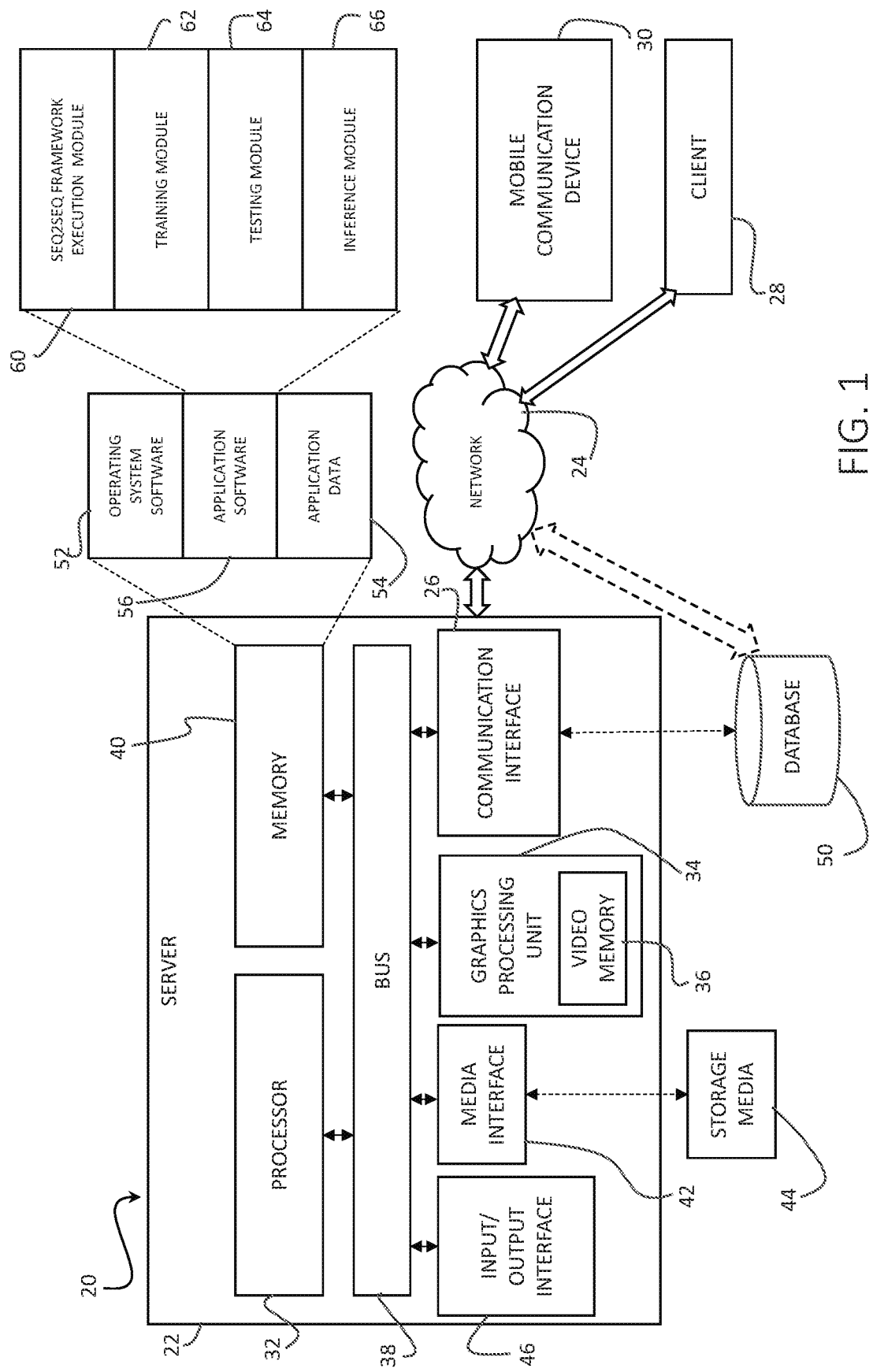
FIG. 1 shows an example system for implementing a framework including a neural sequence-to-sequence (seq2seq) model according to an inventive embodiment.

Conventional training of neural sequence to sequence (seq2seq) models involves the construction of a cross-entropy loss for updating model parameters. For instance, a cross-entropy loss can be derived from combining (e.g., summing) the negative log likelihoods that the model gives to the correct token with respect to each token position in the output sequence. A cross-entropy loss is an example of a local loss, operating at the level of generating individual tokens (as one nonlimiting example, words), in the generated target sequence, but generally ignoring the sequence at a higher level, e.g., as a whole.

However, such a focus on local loss may be detrimental to the effectiveness of the trained seq2seq model when a generated target sequence may be missing or lacking some desired global or semantic properties of target sequences given corresponding source sequences. The absence of such desired global or semantic properties in a generated target sequence is referred to more generally herein as "global loss". "Global" is intended to refer to a state of a sequence as a whole, or at least of a portion of a sequence that is larger than a local portion (such as a portion including a next token to be generated in combination with previously generated tokens), whether or not this larger portion represents the sequence as a whole. However, it is preferred (though not required) that general properties of sequences as a whole are considered for global loss in example methods.

General, nonlimiting examples of such desired global or semantic properties include the avoidance of repetitions, or preservation of a consistency between source and target length ratio. For applications such as (but not limited to) summarization or translation tasks, desired global or semantic properties can alternatively or additionally include satisfying biasedness upon some external evaluation measures, such as (but not limited to) ROUGE, as disclosed in Chin-Yew Lin, 2004, Rouge: A package for automatic evaluation of summaries, in Text Summarization, Branches Out, http://www.aclweb.org/anthology/W04-1013 (Lin, 2004); and BLEU, as disclosed in Kishore Papineni, Salim Roukos, Todd Ward, and Wei-Jing Zhu, 2002, BLEU: A Method for Automatic Evaluation of Machine Translation. In Proceedings of the 40th Annual Meeting on Association for Computational Linguistics, Association for Computational Linguistics, Stroudsburg, Pa., USA, ACL '02, pages 311-318 (Papineni et al., 2002), respectively. As another example, for applications such as (but not limited to) natural language generation, example desired global or semantic properties can additionally or alternatively include, but are not limited to, omissions or additions in one or more semantic materials between a source sequence and a target sequence. Desired global or semantic properties can be considered alone or in any combination.

Example methods and systems provided herein can be used to improve the training of a neural seq2seq model by considering both local loss and global loss in generated target sequences. Local loss can be determined and reduced in the trained model using, for instance, known or to-be-known methods for cross-entropy training. Global loss can be determined and reduced in the trained model based on prior knowledge associated with one or more desired global or semantic properties about the sequence the model aims to generate. In example embodiments, such prior knowledge is incorporated by representing (e.g., embedding or encoding) one or more global or semantic properties using one or more feature functions or constraints. By considering an expectation of such global or semantic properties in target sequences in general given source sequences, the global loss in predicted target sentences can be determined. The seq2seq model can then be trained by combining, in various ways, training based on reducing or minimizing local (cross-entropy) loss with training based on reducing or minimizing global loss.

Methods and systems are provided herein for training a neural sequence-to-sequence (seq2seq) model using a processor. The seq2seq model is configured to receive an input source sequence and output a predicted target sequence based on one or more model parameters. In an example method, the processor receives the model and training data. The training data comprises a plurality of training source sequences and a corresponding plurality of training target sequences. The processor generates, using the seq2seq model, a plurality of predicted target sequences corresponding to the plurality of training source sequences. The model parameters are updated based on a comparison of the generated plurality of predicted target sequences to the corresponding plurality of training target sequences to reduce or minimize a local loss in the predicted target sequences and to minimize or reduce an expected loss of one or more global or semantic features or constraints between the predicted target sequences and the training target sequences given the training source sequences. The expected loss can be based on one or more global or semantic features or constraints of general target sequences given general source sequences. The further updated model parameters for the seq2seq model are saved in a memory to provide the trained seq2seq model.

In certain example methods, the global or semantic features or constraints are generated using the general source sequences and the general target sequences, and the generated global or semantic features or constraints are stored prior to receiving the training data. In certain example methods, the training source sequences comprise at least a portion of the general source sequences, and the training target sequences comprise at least a portion of the general target sequences.

Some example methods for reducing or minimizing global loss provided herein encourage the equality of the expectations of predefined global or semantic features between a model distribution; that is, a distribution (e.g., statistical distribution) from samples generated by the model to be trained, and an empirical distribution; that is, a distribution (e.g., a statistical distribution) from empirical (e.g., training) data. These distributions aim at evaluating the generated sequences globally, e.g., as a whole or at least at a level greater than a local (next token) level, via the use of feature functions or constraints that one would like to behave similarly between the two distributions, based on the representation of the prior knowledge about general sequences.

As methods to reconcile distributions based on particular features have some similarities to methods using moments in statistics, example training methods for reducing or minimizing global loss include what is referred to herein as "moment matching." In general, moment matching refers to a search for an optimal model parameter set reconciling model and empirical distributions based on desired global or semantic properties.

Accordingly, additional methods and systems are provided herein for training a neural sequence-to-sequence (seq2seq) model using a processor. The seq2seq model is configured to receive an input source sequence and output a predicted target sequence based on one or more model parameters. In an example method, the processor receives the model and training data. The training data comprises a plurality of training source sequences and a corresponding plurality of training target sequences. The processor generates a plurality of predicted target sequences corresponding to the plurality of training source sequences using the seq2seq model. The model parameters are updated based on a comparison of the generated plurality of predicted target sequences to the corresponding plurality of training target sequences to reduce or minimize a local loss. The model parameters are further updated to reconcile a distribution of the training target sequences and a distribution of the corresponding predicted target sequences with respect to the training source sequences, wherein the distribution is based on one or more global or semantic features or constraints of general target sequences given general source sequences. The further updated model parameters for the seq2seq model are saved in a memory to provide the trained seq2seq model.

In example methods, the local loss comprises a cross-entropy (CE) loss. This CE loss may, for instance, comprise a cross-entropy of a predicted next token in the predicted target sequences.

In example methods, in combination with any of the above features, the neural seq2seq model is a pretrained model; that is, a model having one or more model parameters that have been determined based on prior training. In example methods, in combination with any of the above features, the neural seq2seq model uses a sequential process implemented via a neural mechanism. In example methods, in combination with any of the above features, the neural mechanism comprises a recurrent neural network.

In example methods, in combination with any of the above features, the training source sequence comprises a first sequence of tokens, the training target sequence comprises a second sequence of tokens, and the predicted target sequence comprises a third sequence of tokens. In example methods, in combination with any of the above features, the tokens in the first sequence, the second sequence, and the third sequence are respectively represented by vectors.

In example methods, in combination with any of the above features, the tokens in the first sequence, the second sequence, and the third sequence each are of one or more types selected from the group consisting of words, characters, images, and sounds. "Images" as used herein can refer to individual or multiple (e.g., groups of) picture elements (pixels), in any format, and/or to individual or multiple (e.g. groups of) volume elements (voxels), in any format. In example methods, in combination with any of the above features, each of the tokens in the first sequence, the second sequence, and the third sequence are of a single type selected from the group consisting of words, words and characters, characters, images, and sounds. In example methods, in combination with any of the above features, the tokens in the first sequence are of a first type selected from the group consisting of words, words and characters, characters, words and characters, images, and sounds; and the tokens in each of the second sequence and the third sequence each are of a second type selected from the group consisting of words, characters, words and characters, images, and sounds, the second type being a different type than the first type.

In example methods, in combination with any of the above features, the seq2seq model comprises a conditional model. In example methods, in combination with any of the above features, the conditional model comprises one or more of a neural machine translation model, a captioning model, or a summarization model.

In example methods, in combination with any of the above features, the seq2 seq model comprises an unconditional model. In example methods, in combination with any of the above features, the unconditional model comprises a text generation model. In example methods, in combination with any of the above features, the text generation model comprises a natural language generation model.

In example methods, in combination with any of the above features, the seq2seq model comprises at least a portion of an encoder-decoder framework. In example methods, in combination with any of the above features, the encoder-decoder framework is an attentional encoder-decoder framework. In example methods, in combination with any of the above features, the seq2seq model comprises at least a portion of a transformer framework. In example methods, in combination with any of the above features, the seq2seq model is implemented using a long short-term memory network (LSTM) and/or a gated recurrent unit (GRU). In example methods, in combination with any of the above features, the seq2seq model is executed on a server.

In example methods, in combination with any of the above features, the global features encode prior knowledge or semantics about the training target sequence. In example methods, in combination with any of the above features, the global features encode external knowledge or semantics about the training target sequence. In example methods, in combination with any of the above features, global features are defined using one or more feature functions. In example methods, in combination with any of the above features, the feature functions comprise conditional feature functions of the training target sequence given the corresponding training source sequence.

In example methods, in combination with any of the above features, the one or more feature functions comprise a function representing a relative quantity of repeated tokens or repeated sets of tokens in the training source and target sequences. In example methods, in combination with any of the above features, the one or more feature functions comprise a function representing a relative quantity of tokens in the training source and target sequences. In example methods, in combination with any of the above features, the one or more feature functions comprise a function representing a relative quantity of selected attributes of one or more tokens in the training source and target sequences. In example methods, in combination with any of the above features, the one or more feature functions comprise a function representing a biasedness determined based upon an external evaluation of the training source and target sequences. In example methods, in combination with any of the above features, the one or more feature functions comprise a function representing a presence or omission of one or more semantic features in the training source and target sequences.

In example methods, in combination with any of the above features, the model parameters comprise one or more weights input to nodes of the seq2seq model. In example methods, in combination with any of the above features, the model parameters comprise one or more biases input to nodes of the seq2seq model.

In example methods, in combination with any of the above features, updating comprises updating the model parameters to reduce or minimize a difference between a model average estimate based on a distribution of the corresponding predicted target sequences and an empirical average estimate based on a distribution of the corresponding training target sequences, wherein the model average estimate and the empirical average estimate are each based on a mathematical representation of the one or more global features or constraints.

In example methods, in combination with any of the above features, updating comprises computing, by the processor, total moment matching gradients over a portion of the generated plurality of predicted target sequences and a corresponding portion of the plurality of training target sequences, the one or more global features or constraints being represented by one or more conditional feature functions.

In example methods, in combination with any of the above features, updating comprises: computing, by the processor, total moment matching gradients over a first portion of the generated plurality of predicted target sequences and a corresponding first portion of the plurality of training target sequences, the one or more global features or constraints being represented by one or more conditional feature functions; computing, by the processor, cross-entropy-based (CE-based) based gradients for a second portion of the plurality of generated predicted target sequences and a corresponding second portion of the plurality of training target sequences; and updating, by the processor, the model parameters based on the computed total moment matching gradients and the computed CE-based gradients.

In example methods, in combination with any of the above features, computing the total moment matching gradients comprises determining a distance between expectations of the one or more global features or constraints over the first portion of generated predicted target sequences and over the corresponding first portion of training target sequences.

In example methods, in combination with any of the above features, computing the total moment matching gradients comprises: determining a score based on a difference between a model average estimate over the first portion of generated predicted target sequences and an empirical average estimate over the corresponding first portion of training target sequences; and combining a CE-based gradient update over the corresponding first portion of training source sequences with the determined score. In example methods, in combination with any of the above features, computing the total moment matching gradients comprises multiplying the CE-based gradient update and the determined score.

In example methods, in combination with any of the above features, updating model parameters comprises selecting a portion of the plurality of training source sequences and the corresponding plurality of training target sequences. In example methods, in combination with any of the above features, generating a plurality of predicted target sequences comprises generating a sample (e.g., a random sample) of J corresponding predicted target sequences y: $y_1, y_2, \ldots, y_K$ using the seq2seq model for each of the training source sequences in the selected portion, where J is at least two. In example methods, in combination with any of the above features, updating model parameters further comprises, for each of the training sequences in the selected portion, computing, by the processor: a model average estimate for each predicted target sequence $y_j$ in $y_1, y_2, \ldots, y_K$ based on a mathematical representation of the one or more global features or constraints, each of the model average estimates being computed over a respective subset of the J predicted target sequences; an empirical average estimate based on the mathematical representation of the one or more global features or constraints over a distribution of the selected plurality of training target sequences that corresponds to the respective training sequence; and an unbiased estimate of a moment matching gradient over the J predicted target sequences based at least on the model average estimates for each predicted target sequence $y_j$ and the empirical average estimate. In example methods, in combination with any of the above features, the updating further comprises computing, by the processor, a total moment matching gradient over the selected portion of the plurality of training source sequences and the corresponding plurality of training target sequences based on the unbiased estimate of the moment matching gradient computed for each of the training sequences in the selected portion; and updating the model parameters according to the computed total moment matching gradient.

In example methods, in combination with any of the above features, computing the unbiased estimate of the moment matching gradient over the J predicted target sequences comprises, for each predicted target sequence $y_j$ in $y_j, y_2, \ldots, y_K$: comparing the model average estimate computed for that predicted target sequence to the computed empirical average estimate; and computing a stochastic gradient using the predicted target sequence $y_j$. In example methods, in combination with any of the above features, for each predicted target sequence $y_j$ in $y_1, y_2, \ldots, y_K$ the respective subset of the J predicted target sequences from which the model average estimate is computed excludes the predicted target sequence $y_j$.

Additional methods and systems are provided for training a neural sequence-to-sequence (seq2seq) model using a processor, in combination with any of the above features. The seq2seq model is configured to receive an input source sequence and output a predicted target sequence based on one or more model parameters. The processor receives the model and training data. The training data comprises a plurality of training source sequences and a corresponding plurality of training target sequences. The processor using the seq2seq model generates a plurality of predicted target sequences corresponding to the plurality of training source sequences. The updating comprises performing, by the processor, for each of a plurality of iterations 1, M:
- selecting a batch of the plurality of training source sequences and corresponding training target sequences;
- providing a plurality of generated predicted target sequences for the selected batch of source sequences using the pretrained model (for iteration 1) or using a model updated in a preceding iteration (for iterations 2, ..., M);
- computing, by the processor, total moment matching gradients over a first portion of the generated predicted target sequences and a corresponding first portion of the training target sequences, wherein the computing comprises determining a distance between expectations of one or more global features or constraints over the first portion of generated predicted target sequences and over the corresponding first portion of training target sequences, the one or more global features or constraints being represented by one or more conditional feature functions;
- computing, by the processor, cross-entropy-based (CE-based) based gradients for a second portion of generated predicted target sequences and a corresponding second portion of training target sequences; and
- updating, by the processor, the model parameters based on the computed total moment matching gradients and the computed CE-based gradients.

Additional methods and systems are provided for training a pretrained neural sequence-to-sequence (seq2seq) model using a processor, in combination with any of the above features. The seq2seq model is configured to receive an input source sequence and output a predicted target sequence based on one or more model parameters. The processor receives the model and training data. The training data comprises a plurality of training source sequences and a corresponding plurality of training target sequences. The processor using the seq2seq model generates a plurality of predicted target sequences corresponding to the plurality of training source sequences. The processor performs, for each of a plurality of iterations 1, ..., M:
- selecting a batch of the plurality of training source sequences and corresponding training target sequences;
- randomly sampling a plurality of generated predicted target sequences for the selected batch of source sequences using the pretrained model (for iteration 1) or using a model updated in a preceding iteration (for iterations 2, ..., M);
- in each of a first set of iterations between 1 and M:
  - computing, by the processor, total moment matching gradients over the selected batch using the randomly sampled plurality of generated predicted target sequences and the selected batch of corresponding training target sequences, wherein the computing comprises determining a distance between expectations of one or more global features or constraints over the randomly sampled plurality of generated predicted target sequences and over the selected batch of corresponding training target sequences, the one or more global features or constraints being represented by one or more conditional feature functions; and
  - updating, by the processor, the model parameters for the selected batch using gradient descent (GD) based on the computed total moment matching gradients to update the seq2seq model; and
- in each of a second set of iterations between 1 and M alternating with the first set of iterations:
  - computing, by the processor, cross-entropy-based (CE-based) gradients for the selected batch using the randomly sampled plurality of generated predicted target sequences and the selected batch of corresponding training target sequences; and
  - updating, by the processor, the model parameters for the selected batch using gradient descent (GD) based on the computed CE-based gradients to update the seq2seq model.

After performing iterations 1, ..., M, the processor saves in a memory the updated model parameters for the seq2seq model with respect to a best score based on minimizing an approximation of the moment matching loss over at least a portion of the training data, to provide the trained seq2seq model.

Additional methods and systems are provided for training a pretrained neural sequence-to-sequence (seq2seq) model using a processor, in combination with any of the above features. The seq2seq model is configured to receive an input source sequence and output a predicted target sequence based on one or more model parameters. The processor receives the pretrained model and stored parallel training data, where the training data comprises a plurality of training source sequences and a corresponding plurality of training target sequences. The processor performs, for each of a plurality of iterations 1, ..., M:
- selecting a batch of the plurality of training source sequences and corresponding training target sequences;
- randomly sampling a plurality of generated predicted target sequences for the selected batch of source sequences using the pretrained model (for iteration 1) or using a model updated in a preceding iteration (for iterations 2, ..., M);
- computing, by the processor, total moment matching gradients over the selected batch using the randomly sampled plurality of generated predicted target sequences and the selected batch of corresponding training target sequences, wherein the computing comprises determining a distance between expectations of one or more global features or constraints over the randomly sampled plurality of generated predicted target sequences and over the selected batch of corresponding training target sequences, the one or more global features or constraints being represented by one or more conditional feature functions;

computing, by the processor, cross-entropy-based (CE-based) based gradients for the selected batch using the randomly sampled plurality of generated predicted target sequences and the selected batch of corresponding training target sequences; and updating, by the processor, the model parameters for the selected batch using gradient descent (GD) based on the computed total moment matching gradients, the computed CE-based gradients, and a balancing factor to update the seq2seq model; and after performing iterations 1, ..., M, saving in a memory the updated model parameters for the seq2seq model with respect to a best score based on minimizing an approximation of the moment matching loss over at least a portion of the training data, to provide the trained seq2seq model.

Additional methods and systems are provided herein for generating a target sequence from a source sequence. A neural sequence-to-sequence (seq2seq) model is trained using a processor according to any of the above methods. An unknown source sequence is received by the trained seq2seq model. The target sequence is generated using the trained seq2seq model, and the generated target sequence is saved.

Additional methods and systems are provided herein for generating a target sequence from a source sequence. The source sequence is received, and a trained neural sequence-to-sequence model configured to receive the received source sequence and output the target sequence based on one or more model parameters is accessed in a memory. The target sequence corresponding to the received source sequence is generated using the trained neural sequence-to-sequence model, and the generated target sequence is output. The trained neural sequence-to-sequence model is trained using a processor that: receives a neural sequence-to-sequence (seq2seq) model and training data, the training data comprising a plurality of training source sequences and a corresponding plurality of training target sequences; generates, using the seq2seq model, a plurality of predicted target sequences corresponding to the plurality of training source sequences; updates the model parameters based on a comparison of the generated plurality of predicted target sequences to the corresponding plurality of training target sequences to reduce or minimize a local loss in the predicted target sequences and to minimize or reduce an expected loss of one or more global or semantic features or constraints between the predicted target sequences and the training target sequences given the training source sequences, wherein the expected loss is based on one or more global or semantic features or constraints of general target sequences given general source sequences; and saves in the memory the updated model parameters for the seq2seq model to provide the trained neural sequence-to-sequence model.

In example methods, in combination with any of the above features, the seq2seq model comprises a conditional model that comprises one or more of a neural machine translation model, a captioning model, and a summarization model. In example methods, in combination with any of the above features, the model parameters comprise one of: weights input to nodes of the seq2seq model, and one or more biases input to nodes of the seq2seq model.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example system 20 for implementing a framework including a neural sequence-to-sequence (seq2seq) model according to an inventive embodiment. The system includes a computer, such as but not limited to a server computer (server) 22, which may be connected over a network 24 via one or more communication interfaces 26 to one or more client computers (clients) 28 for exchanging data. A computer can be embodied in a server computer 22 as shown in FIG. 1, or may be embodied in a local computer, a client computer, a personal computer, a mobile communication device 30 (e.g., a portable phone or other computing device, personal digital assistant, wearable device, embedded processor, augmented reality device, virtual reality device, etc.), or any other suitable computing device that can be configured to perform methods disclosed herein, or any combination of computing devices.

The example network 24 may be embodied in one or more of a wireless network or a wired network, such as but not limited to a local area network (LAN or WLAN), a wide area network (WAN or WWAN), the Internet, a telecommunications network such as a public switched telephone network (PSTN), landline network, Ethernet or fiber network, a radio network such as a frequency-hopping spread spectrum (FHSS) radio network, GPRS network, Wi-Fi (e.g., 802.11) network, Wi-Max (e.g., 802.16) network, TCP/IP network, CDMA network, or network including any combination of the above.

Each of the communication interfaces 26 may be software and/or hardware associated in communicating to other devices. The communication interfaces 26 may be of one or different types that include a user interface, USB, Ethernet, Wi-Fi, wireless, RF, optical, cellular, or any other communication interface coupled to the network.

The computer 22 includes a processor 32, which may include one or more of a general purpose processor, a special purpose processor, a conventional processor, a digital signal processor (DSP), a virtual processor executed by one or more additional processors, a plurality of microprocessors operating in series or in parallel, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and others. The processor 32 may perform one or a combination of signal coding, data processing, power control, input/output processing, and/or any other functionality that enables the computer 22 and/or the system to operate in accordance with its intended functionality. Reference to a "processor" herein is intended to likewise refer to either a single processor, or to one or more processors operating in series and/or in parallel.

The computer 22 may further include a graphics interface, including a graphics processing unit (GPU) 34, video memory 36, and/or video interface (not shown). These components may cooperate to display graphics and text on a video monitor, such as a display (not shown). A GPU 34 may additionally or alternatively provide all or a portion of a processor.

The processor 32 may receive, generate, and process data as provided in one or more methods disclosed herein. In operation, the processor 32 may fetch, decode, and execute one or more instructions, and transfer information to and from other resources via a transfer path of the computer, such as a system bus 38. An example system bus 38 connects example components in the computer 22 and can define the medium for data exchange. A system bus 38 typically includes data lines for sending data, address lines for sending addresses, and control lines for sending interrupts and for operating the system bus. A nonlimiting example of such a system bus 38 is or includes a PCI (Peripheral Component Interconnect) bus.

The computer 22 further includes a memory 40, which may include computer-readable storage media in the form of volatile and/or nonvolatile memory such as read only memory (ROM), EEPROM, and RAM. A basic input/output system (BIOS), containing basic routines as will be appreciated by those ordinary skilled in the art, may be stored in ROM. RAM may contain, for instance, data, data tables, and/or modules (e.g., program modules) that are immediately accessible to and/or presently being operated on by the processor 32.

The computer 22 may also include, receive, or interface (e.g., via a media interface 42) with computer-readable storage media 44. Computer readable storage media 44 include volatile and nonvolatile, removable and non-removable media implemented in any non-transitory (i.e., tangible or physical) method or technology for storage of information, but such computer readable storage media do not merely include signals. Nonlimiting examples include RAM, ROM, EEPROM, flash memory or other memory technology, disk drives such as a hard disk drive (HDD), magnetic disk drives, magnetooptical disk drives, optical disk drives such as CD-ROM, BD-ROM, and digital versatile disks (DVD).

Other example computer storage media 44 includes, but are not limited to, magnetic tape cassettes, flash memory cards, digital versatile disks, digital video tape, solid state RAM, solid state ROM, etc. Such drives and their associated computer storage media can provide storage of computer readable instructions, data structures, program modules and other data for the computer 22.

The computer 22 may include one or more input devices (not shown) for entering commands and information into the computer. Example input devices include keyboards, buttons, pointing devices, trackball, touch pads, touch screens, dials, microphones, joysticks, game pads, satellite dishes, scanners, and others. These and other input devices can be connected to the processor 32 through a suitable user input/output interface 46 coupled to the system bus 38, or by other interface and bus structures, such as a parallel port, game port or a universal serial bus (USB). The computer 22 may connect to the network through a communication interface, such as but not limited to a network interface or adapter.

It will be understood that any or all of the apparatuses, systems, methods and processes described herein may be embodied in the form of computer executable instructions (i.e., program code) stored on a computer-readable storage medium (e.g., a non-transitory computer-readable storage medium), which instructions, when executed by a processor such as the processor 32, cause the processor to perform and/or implement the systems, methods and processes described herein. Specifically, any of the steps, operations or functions described herein may be implemented in the form of such computer executable instructions, executing on the processor of a computer, or apparatus or system including such a computer. Reference herein to any method is intended to also be a reference (to the extent practicable) to processes incorporating such methods or any portion thereof, to apparatuses or systems implementing such methods or any portion thereof, or to computer executable instructions stored on a computer-readable storage medium which instructions, when executed by the processor, cause the processor to perform and/or implement such methods or any portion thereof.

The example system 20 preferably, but not necessarily, includes a database 50. The database 50, if provided, may be in communication with the computer 22 or incorporated within the computer. The database 50 includes memory such as any of the memory 40 mentioned above, and can include a processor for executing database software embodied in computer executable instructions. The database software can be made available to the processor of the database 50 in similar or different manner to other computer executable instructions herein.

The memory 40 preferably includes (e.g., stores) operating system software 52, data, e.g., application data 54, that can be processed by the processor, and application software 56, e.g., one or more modules containing computer-executable instructions for causing the processor 32 to process the data according to example methods herein. Data stored in the memory 40 or a portion thereof can additionally or alternatively be stored in the database 50, or stored in the database and transferred (e.g., loaded) into the memory.

In the example system 22 shown in FIG. 1, the memory 40 stores, as part of the application software 56, a module 60 for executing a framework including a neural sequence-to-sequence (seq2seq) model, a module 62 for training the neural seq2seq model, a module 64 for testing or validating the trained neural seq2seq model, and a module 66 for inference using the trained seq2seq model. The memory 40 further stores the application data 54, which can include, for instance, model parameter data for configuring the neural seq2seq model and training data, which may be loaded from the database 50 or from other memory, delivered via the communication interface 26, or provided in other ways for use by the processor 32. The memory 40 may also store, as part of the application data 54, one or more unknown source sequences to be introduced into the trained neural seq2seq model or the framework, one or more predicted target sequences output by the trained neural seq2seq model, and any additional working data used during operation of the framework beyond the trained neural seq2seq model.

Figure 2:
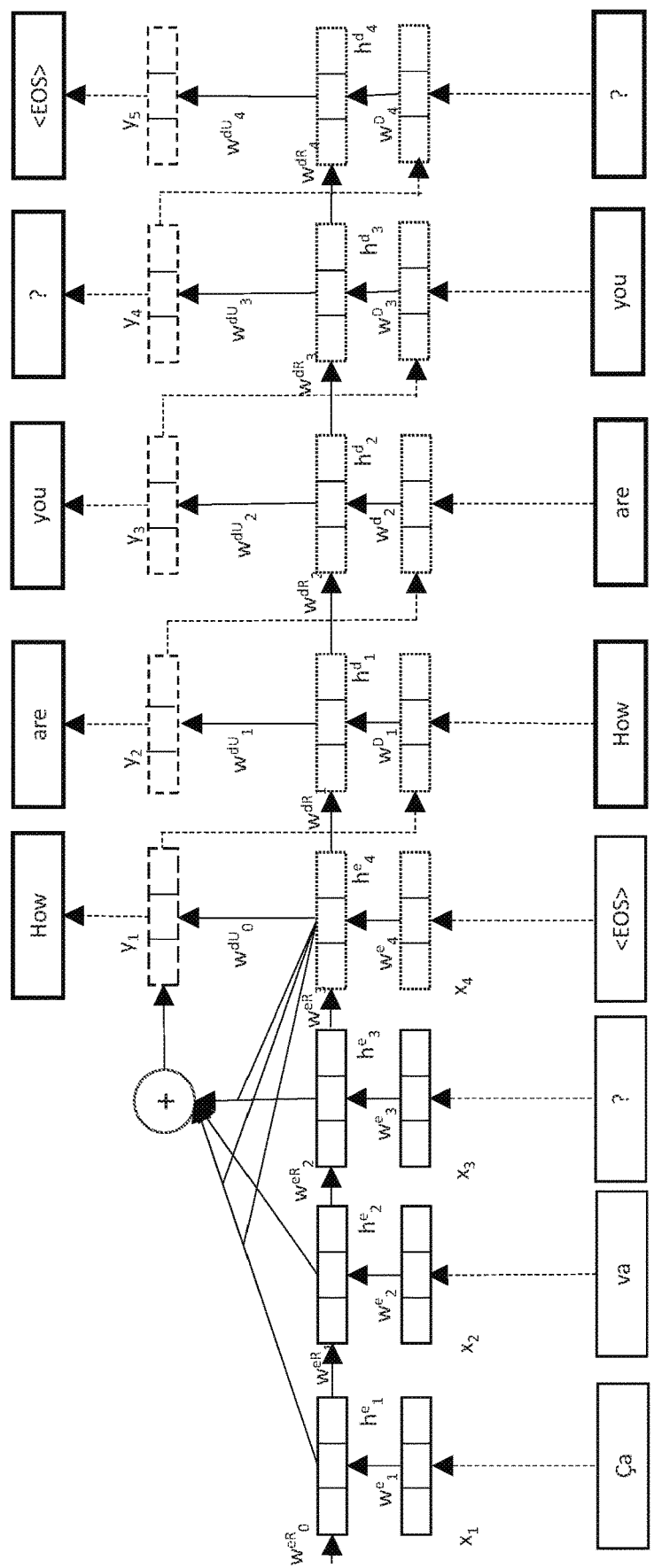
FIG. 2 shows an example recurrent neural network (RNN)-based framework including a seq2seq model.

FIG. 2 shows an example framework (architecture) including a neural seq2seq model, which in this example provides one output sequence for one input sequence (though it is also contemplated that several output sequences could be provided). The framework can be implemented, for instance, by execution of one or more modules. The modules may include one or more submodules for executing one or more components of the framework. The example framework shown in FIG. 2 is an encoder-decoder framework. However, other encoder-decoder frameworks, such as attention encoder-decoder frameworks, or frameworks such as transformer frameworks can instead be provided. The seq2seq model may be implemented using one or more neural networks such as but not limited to recurrent neural networks (RNNs) (e.g., long short-term memory networks (LSTM) gated recurrent units (GRU)), as will be appreciated by those of ordinary skill in the art.

As shown in FIG. 2, an example encoder-decoder framework includes an encoder (e.g., an LSTM encoder or GRU model) that receives an input source sequence of tokens and produces an intermediate output (a hidden state), and a decoder, which receives the intermediate output and produces an output predicted target sequence of tokens. The example encoder in FIG. 2 includes a recurrent neural network (RNN) sequence (e.g., a layer or stack of layers of LSTMs), providing a sequence of internal (or hidden) states. In each hidden state, the RNN layer, which can include one or more nodes (not shown), accepts a next individual token $x_1, \ldots x_m$ of the source sequence, collects information, and forwards the information (as shown, as hidden state $h_i$) to the next RNN layer until each token in the source sequence has been processed. The end of the source sequence can also be indicated, for instance, by an end-of-sequence token. The result of the encoder, typically the last hidden state, is an intermediate output that represents the collected information for the source sequence. In the example framework, the encoder receives, at four time steps 1 . . . 4, an input source sequence including tokens for individual words and characters forming the French language sentence "Ça va?" and a special end-of-sequence (or end-of-sentence) token <EOS> indicating an end of the input. The EOS token may also initialize the encoder.

As further shown in FIG. 2, the decoder (e.g., an LSTM decoder or GRU model) includes an RNN sequence (e.g., a layer, or stack of layers, of LSTMs). Each RNN layer respectively generates a next token $y_1, \ldots, y_i$ in a predicted target sequence based on the intermediate output. The predicted target sequence can be completed when a token representing an end of sequence (or end-of-sentence) (<EOS>) is generated by an RNN layer in the decoder. The resulting predicted target sequence is the English language sentence "How are you?"

In an example encoder-decoder framework, the decoder generates the next token in the predicted target sequence based on the final hidden state (e.g., context vector) of the encoder that provides the intermediate output. In an attentional encoder-decoder, such as that shown in FIG. 2, one or more RNN layers of the decoder may generate the next token in the predicted target sequence further based on a combination (e.g., a weighted combination) of multiple (e.g., all) input hidden states $h_1, \ldots h_n$, shown as (+) in the figure.

The input sequence can include a sequence of tokens, where each token is represented mathematically by a vector. The hidden states of the encoder are then preferably mathematically represented by a higher-dimensional vector (e.g., an n- or greater dimensional vector for an n-token input sequence). The output sequence can also include a sequence of tokens, where each token is represented mathematically by a vector.

The types of tokens in the input (source) and output (target) sequences can vary according to the application provided by operation of the configured neural seq2seq model, and accordingly the domains of the source and target sequences. For instance, the tokens in the input sequence and/or the target sequence may be of one or more of words, characters (e.g., letters, symbols, etc.), words and characters (e.g., a combination of letters and symbols such as punctuation or numerals) images, or sounds.

In some example methods, each of the tokens in the input sequence and the target sequence are of a single type selected from the above group (e.g., both may be words, or words and characters, such as for an example machine translation application (neural machine translation (NMT) models for certain pairs of languages). In other example methods, the tokens in the input sequence are of a first type selected from the above group, while the tokens in the target sequence each are of a second type selected from above the group, where the second type is a different type than the first type (e.g., tokens in the input sequence may be characters, or words and characters of a first type, and the tokens in the output sequence may be words (or words and characters of a different type), for NMT models for other pairs of languages; or, the tokens in the input sequence may be sounds or phonemes, while the tokens in the output sequence may be words or words-plus-characters, such as for an example text-to-speech application; or, the tokens in the input sequence may be images, while the tokens in the output sequence may be words or words-plus-characters, such as for an example captioning application). One nonlimiting example method for mathematically representing a token by a vector is encoding the token using a One Hot Encoding vector. Those of ordinary skill in the art will appreciate that there may be other methods for representing particular types of tokens mathematically as vectors.

Example seq2seq frameworks can be configured to provide various models. Example conditional models include, but are not limited to, neural machine translation models, captioning models, parsers, tag generators, summarization models, etc. Example unconditional models include, but are not limited to, text generation models, such as natural language generation models (language models, chatbots, question answering models, etc.). Combinations of conditional and unconditional models can be provided. A seq2seq "model" as used herein may refer to a set of model parameters (e.g., model weights) alone, or to a combination of a particular seq2seq architecture that includes one or more neural networks, along with a set of model parameters, or along with one or more activation functions and a set of model parameters. Example activation functions include, but are not limited to, softmax, sigmoid, tan h, arctan, rectified linear unit (ReLU), and leaky ReLU.

As will be appreciated in the art, the RNN layers in the neural seq2seq model can be implemented by software such as but not limited to software written in suitable programming languages (e.g., TensoFlow, Pytorch, Keras), where such software is executed by the processor. Each RNN layer executes one or more functions given previous hidden state(s) and one or more model parameter matrices (e.g., weight matrices, shown as $W_i$ in FIG. 2, and having superscripts representing encoding (e and eR) decoding (d and dU)) and biases (not shown)). This provides example methods for the neural seq2seq model to receive an input source sequence $x_1, \ldots x_n$ and generate a predicted target sequence $y_1, \ldots, y_i$ corresponding to the source sequence based on the one or more model parameters.

Figure 3:
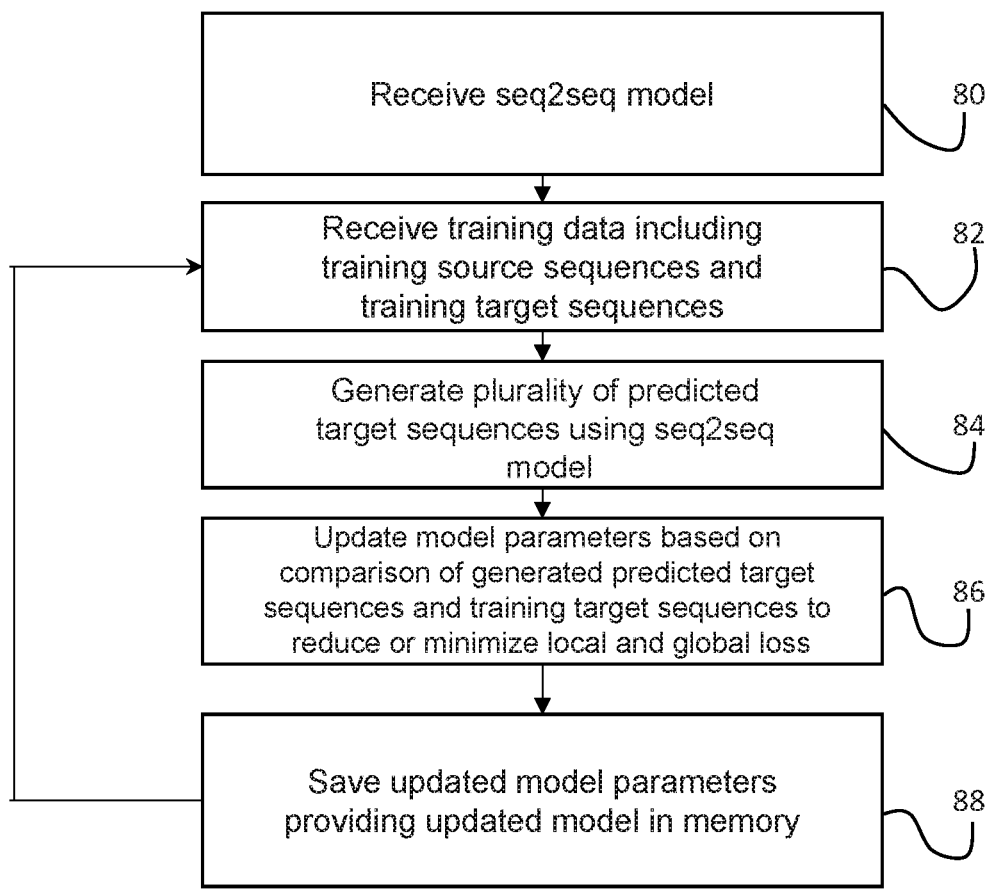
FIG. 3 shows steps in an example method for training a seq2seq model according to an inventive embodiment.

FIG. 3 shows an example method for training a neural sequence-to-sequence (seq2seq) model. The seq2seq model can be, for instance, the seq2seq model shown in FIG. 2, or any other seq2seq model that is configured to receive an input source sequence and output a predicted target sequence based on one or more model parameters and is capable of being trained using example methods disclosed herein.

The processor receives the seq2seq model (step 80). For instance, the processor 32 may receive (e.g., load) one or more modules in the memory 40 configured for generating RNN layers according to a selected and stored model framework. Alternatively, the processor 32 may select to receive the seq2seq model. Example model frameworks include encoder-decoder, attentional encoder-decoder, transformer, and/or convolution-based models.

Initial model parameters of the seq2seq model may also be loaded by the processor 32 from the memory 40, or otherwise the processor may choose to receive the model parameters. Model parameters include one or more weights or biases that are input to layers (e.g., layers of nodes) of the seq2seq model during execution. The provided seq2seq may be pretrained to determine one or more of the initial model parameters, in which case the determined initial model parameters can be received by the processor. Default or random values can also be provided for initial model parameters.

The processor receives the training data (step 82). Training data may be received by the processor 32 from the memory 40, and may be introduced to the memory, for instance, from the database 50 if storing the training data (or a portion or superset thereof) or from any other source accessible by a suitable communication link, such as communication interface 26. The training data includes a plurality (e.g., a batch) of tuples (pairs) of training source sequences and corresponding plurality of training target sequences. As will be appreciated by those of ordinary skill in the art, in each respective pair of the training source and training target sequences, the training source sequence can include a first sequence of tokens, and the training target sequence can include a second sequence of tokens corresponding to the first sequence of tokens. An example source of the training data is a training corpus stored in the database 50 or other suitable storage that is in communication with the memory 40 of the computer.

The processor 32 generates, using the seq2seq model, a plurality of predicted target sequences corresponding to the plurality of training source sequences (step 84), e.g., a set for each training iteration during the training. For example, for each of one or more respective pairs of training source and training target sequences including first and second sequences of tokens as described above, the generated predicted target sequence corresponding to the training source sequence can include a third sequence of tokens corresponding to the first sequence (and to the second sequence). In some example methods, this third sequence of tokens can be part of a plurality of third sequences of tokens that are generated by using the seq2seq model to generate values of such third sequences and then selecting, e.g., sampling, and preferably randomly sampling, such generated values.

The processor 32 can generate the predicted target sequences, for instance, by executing the received seq2seq model using each of (or a batch of) the received plurality of training source sequences as input, with recent (e.g., original, previously updated, or most recently updated) model parameters, to process each of the training source sequences, and generate the predicted target sequences. Nonlimiting example methods for generating predicted target sequences are disclosed in Neubig, Graham, "Neural Machine Translation and Sequence-to-sequence Models: A Tutorial," Language Technologies Institute, Carnegie Mellon University, Mar. 5, 2017, arXiv.org/abs/1703.01619, which is incorporated by reference herein in its entirety.

For each training iteration, the number of training source sequences that are received (e.g., a batch size), and the number of corresponding predicted target sequences (e.g., including numbers of samples) that are generated for each training source sequence, can be based on the computing resources available (e.g. amount of GPU memory). Multiple training iterations may be used to further improve the seq2seq model. The training can be completed, for instance, when all training batches have been used, after a set amount of time or iterations, in response to fulfillment of stopping criteria (e.g., convergence), such as loss on validation set, or based on other criteria.

The model parameters are updated (step 86) based on a comparison of the generated plurality of predicted target sequences to the corresponding plurality of training target sequences. This updating reduces or (preferably) minimizes a local loss in the predicted target sequences. Further, this updating reduces or (preferably) minimizes a global loss represented by an expected loss of one or more global or semantic features or constraints between the generated predicted target sequences and the training target sequences given the training source sequences. The updated model parameters, which provide the trained seq2seq model, can be saved (step 88) in memory (including, for instance, the memory 40, storage media 44, database storage 50, or other non-transitory storage).

A comparison of the generated plurality of predicted target sequences to the corresponding plurality of training target sequences can include, for instance, determining (e.g., computing, calculating, or otherwise assessing) one or more differences between all or a portion of the generated plurality of predicted target sequences to the corresponding plurality (e.g., batch) of training target sequences with respect to one or more features. Differences can include calculated differences (e.g., after subtraction), and/or calculated gradients.

The comparison can be made with respect to one or more features included within the generated plurality of predicted target sequences and the corresponding plurality of training target sequences, with respect to one or more features that can be derived from features included within the generated plurality of predicted target sequences and the corresponding plurality of training target sequences, or a combination of both of these. Comparisons can be with respect to all or a portion of individual sequences. Further examples of comparisons are described below.

Updating the model parameters to reduce or minimize a local loss in the predicted target sequences can include, for instance, comparing the generated plurality of predicted target sequences and the corresponding plurality of training target sequences to determine both a local loss and an expected loss; and updating the model parameters to reduce or minimize the determined local loss and expected loss. Nonlimiting example methods for updating model parameters given determined losses are disclosed in Neubig, Graham, "Neural Machine Translation and Sequence-to-sequence Models: A Tutorial," cited above.

Both the local loss and the expected loss can be determined for the same sets of predicted target sequences and corresponding plurality (e.g., batch) of training target sequences. Alternatively or additionally, the local loss can be determined for a portion of the sets of predicted target sequences and corresponding plurality (or batch) of training target sequences, and the expected loss can be determined for other portions of the sets of predicted target sequences and corresponding plurality of training target sequences. For example, in one or more first training iterations, the local loss can be determined, while in one or more second training iterations (such as but not limited to iterations alternating with the first training iterations), with or without updated model parameters, the expected loss can be determined.

The local loss can be or include, for instance, a cross-entropy (CE) loss between the training target sequence(s) and the generated predicted target sequence(s). Determining a CE loss can be performed using methods known to those of ordinary skill in the art, or methods to-be-known. Example methods for determining local loss are disclosed in Neubig, Graham, "Neural Machine Translation and Sequence-to-sequence Models: A Tutorial," cited above. Illustrative example methods for determining CE loss are discussed below.

The expected loss is determined based at least on one or more global or semantic features or constraints between target sequences and source sequences, alone or in combination with a determined local loss. These global or semantic features may, for instance, encode external knowledge or semantics about general target sequences and corresponding general source sequences.

To determine global or semantic features in target sequences and source sequences, the one or more global or semantic features (also more generally referred to herein as global features) are defined using one or more feature functions. For example, the feature functions may be or include conditional feature functions of the training target sequence given the corresponding training source sequence. Such feature functions may be represented mathematically or otherwise.

Initially defining such global features can be performed by a person, by a computer (e.g., using a statistical or other pattern-recognition method), or a combination. For instance, a human and/or computer may recognize and define one or more desired global aspects of a relation between target and source sequences in general that are not necessarily reflected in a more local (e.g., token-for-token) comparison of these sequences. These defined global aspects are then expressed (e.g., embedded or encoded) as one or more feature functions (e.g., by mathematically defining the recognized aspects as functions). Expressed feature functions may be stored in the memory 40. The expressed feature functions are used to quantify and then compare such global features, or expectations of the same, to determine global loss. This injects prior or external knowledge of such global aspects of relations (that is, the knowledge that such relations are or may be present) into example training methods.

The feature functions can include any mathematical (including logical) function that at least partially represents one or more global aspects of a relation between source and target sequences. Multiple feature functions can be represented by one or more vectors. The results of the mathematical functions can be selected and configured for representation by vectors or otherwise. As a non-limiting example, an output of a particular feature function can be a number (as one example, between zero and one) or set of numbers, a binary (or n-ary) result, a logical result, or any other suitable result.

Feature functions need not provide absolute detection of such desired global aspects, but can instead, for instance, be at least partially correlated with such global aspects. The manner in which feature functions are mathematically expressed can vary depending on the types, lengths, etc. of sequences and associated tokens, the computational cost, and/or the nature of the recognized relationship between the source and target sequences.

Effectiveness of the detection of global aspects provided by a particular feature function may vary, for instance, based on the degree to which the global aspects can be quantified, and/or the prevalence of such global aspects in general. Relations that are more consistent (or universal), less complex to parse and/or interpret (e.g., not as subtle), and/or can be more precisely quantified, for instance, may (but need not) be expressed in simpler functions and/or involve more consistent detection. By contrast, recognized semantic and/or less consistent (or universal) or more subtle aspects, for instance, may (but need not) involve greater approximation and/or be expressed in more complex feature functions.

Given the above, it will be appreciated that a list of possible feature functions that may be used in example methods will not be exhaustive. However, for illustration only, example feature functions will now be described.

As one example, the one or more feature functions may comprise a function representing a relative quantity of repeated tokens or repeated sets of tokens in the training source and target sequences. A relative quantity can be, as a nonlimiting example, a ratio, fraction, etc. If, for instance, the tokens represent words and the seq2seq model is used for machine translation (MT or NMT (neural machine translation)), a feature function can be or include a ratio of the number of repeated words and/or repeated (continuous or discontinuous) phrases in the target sequence with respect to that of the source sequence (or vice versa).

As another example, the one or more feature functions may comprise a function representing a relative quantity of tokens in the training source and target sequences. If, again, the tokens represent words and the seq2seq model is used for machine translation, a feature function can be or include a ratio of the number of total words in the target sequence with respect to that of the source sequence (or vice versa). This provides, for instance, a ratio of target length to source length (or vice versa).

As another example, instead of or in addition to being based on quantities of the tokens themselves, the one or more feature functions include a function representing a relative quantity of selected attributes of one or more tokens in the training source and target sequences. Alternatively or additionally, a feature function can represent a syntax of one or more tokens. For instance, if the tokens represent words, words or phrases having certain attributes (parts of speech, punctuation, connotation or semantic attributes, syllables, phonemes, etc.) may be quantified. If the tokens represent images or portions thereof (e.g., pixels or voxels, or groups thereof), attributes of the images (intensity, color, etc., or patterns of the same) may be quantified. Tokens representing sound can have quantified attributes such as frequency, harmonics, duration, phase, intensity, etc., or patterns of the same. If tokens represent code portions, symbols, or binary digits, global patterns may be present between source and target sequences of the same.

Because the tokens in the source and target sequences need not be of the same type for every application, feature functions may be based on quantities of different types. For instance, a feature function for training a seq2seq model used for a dictation (speech-to-text) application may include, for instance, a ratio of a quantity of sibilant sounds in a speech sequence to a quantity of consonants in a generated text sequence.

As another example, the one or more feature functions include a function representing a presence or omission of one or more semantic features in the training source and target sequences. Semantic features can include features relating to meaning, as opposed to syntax that may be primarily concerned with grammar or structure. If, for instance, the tokens represent words, semantic features may include the presence or absence of typically more formal words or phrases, or instead the presence or absence of more colloquial words or phrases. Other example semantic features include sentiment (e.g., positive or negative), subtle or hidden meanings, sarcasm, and others.

As another example, the one or more feature functions can include a function representing a biasedness determined based upon an external evaluation of the training source and target sequences. Nonlimiting examples of feature functions based on external evaluation include ROUGE and BLEU scoring functions.

Given one or more defined feature functions, sets (e.g., pairs) of general source and target sequences (such as pairs of training source and target sequences, or other pairs of source and target sequences) can be processed using the defined feature functions to determine, e.g., mathematically or otherwise, one or more results representing global or semantic features of general target sequences given general source sequences. In an example processing method, each general source sequence and general target sequence, either individually or in sets (depending on how the particular feature function is calculated), is evaluated using the one or more feature functions to determine one or more global or semantic features. These results can be represented as vectors. A distribution of the general target sequences (given the associated general source sequences) is generated based on the determined one or more global semantic features. The distribution can be based on any type. One example is a statistical distribution. As the general source and target sequences (such as, but not limited to, sets of training source and target sequences) can be empirical data, such distributions can be referred to in some examples as an empirical distribution.

Similarly, sets (e.g., pairs) from the batch of training source sequences and the corresponding generated plurality of predicted target sequences are processed using the defined feature functions to determine, e.g., mathematically or otherwise, one or more results representing global or semantic features of predicted target sequences given training source sequences. These results can be represented as vectors. A distribution of the predicted target sequences is generated (given the associated training source sequences) based on the determined one or more global semantic features. The distribution can be based on any type. One example is a statistical distribution. As the predicted target sequences are generated from the seq2seq model, such distributions can be referred to in some examples as a model distribution.

As a nonlimiting illustration, suppose the source and target sequences are sequences of words, and the global or semantic feature function is a ratio of the number of words in the associated sequences (target length to source length). Each pair of general source and general target sequences in a set, e.g., a set of training source sequences and training target sequences, is evaluated, for instance, by determining the number of words in each sequence and calculating a ratio of the number of words in each general target sequence to the number of words in the respective general source sequence. A distribution of this ratio can be then be generated over the selected set of general target sequences to provide an example empirical distribution. A similar evaluation is performed for the selected batch of training source sequences and the corresponding generated plurality of predicted target sequences to provide an example model distribution.

The model distribution and empirical distribution can then be compared to one another, e.g., mathematically, to determine a gradient. This gradient represents the difference in global or semantic loss with respect to model parameters. As one nonlimiting example, an empirical average estimate is generated based on the empirical distribution, and a model average estimate is generated based on the model distribution. The gradient between the determined empirical average estimate and the model average estimate can represent global or semantic loss.

The determined local loss and global or semantic loss are then used as an input to an optimization algorithm to update the one or more model parameters. The updated model parameters are thus determined over one or more iterations with an objective of reducing, or optimally minimizing, the local and global loss. For instance, the model parameters can be updated to reconcile the model and empirical distributions.

It is preferred that reducing or minimizing global loss be provided as a supplement to reducing or minimizing local loss to more effectively generate target sequences. For instance, updating model parameters for reducing or minimizing local loss and updating model parameters for reducing or minimizing global loss can be performed in combination, e.g., within the same iteration. One example method for such a combination is a weighted combination, wherein the respective weights can be selected or determined in advance or based on results from training. Alternatively or additionally, updating model parameters for reducing or minimizing local loss and updating model parameters for reducing or minimizing global loss can be performed in separate iterations, e.g., alternately or in some other pattern. In either method, the model parameters are updated based on a comparison of the generated plurality of predicted target sequences to the corresponding plurality of training target sequences to reduce or minimize a local loss, and further updated (e.g., in the same iteration or a different iteration) to reduce or minimize a global loss by reconciling a distribution of the training target sequences and a distribution of the corresponding predicted target sequences with respect to the training source sequences.

Example methods for updating the model parameters employ optimization algorithms such as, but not limited to, stochastic gradient descent (SGD), SGD With Momentum, Conjugate Gradient, Hessian Free, LBFGS, Line Gradient Descent, Nesteroys, Adagrad, Adadelta, RMSProp, Adam, and others. The further updated model parameters for the seq2seq model are saved, e.g., in a memory (step 88), to provide the trained seq2seq model.

Figure 4:
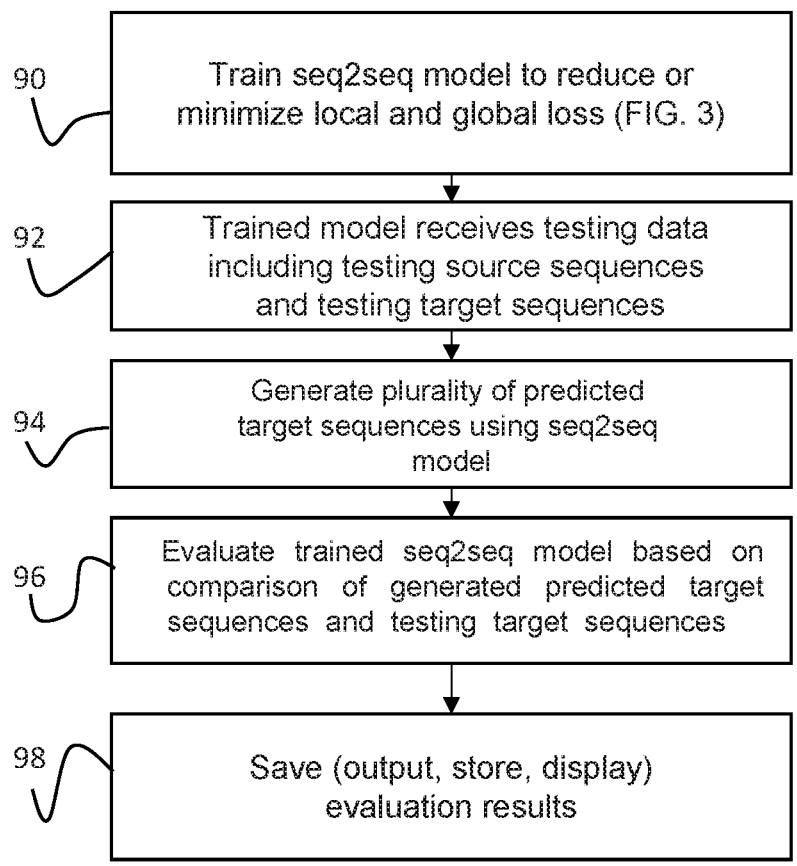
FIG. 4 shows steps in an example method for validating a trained seq2-seq model according to an inventive embodiment.

The seq2seq model trained using example methods can also be tested (and validated) according to additional methods. FIG. 4 shows steps in an example method for testing and/or validating a trained seq2-seq model according to an inventive embodiment. A seq2seq model is trained according to any of the above methods (step 90).

One or more testing source sequences are input into the trained seq2seq model (step 92). A source of testing source sequences can be provided, for instance, from a training corpus having tuples of source sequences and corresponding target sequences (testing or validating target sequences) such as that used for training the seq2seq model as disclosed. Target sequences corresponding to the testing source sequences are generated using the trained seq2seq model (step 94). The generated target sequences are evaluated with respect to the corresponding testing target sequences using any suitable comparison method (step 96). Nonlimiting example evaluation methods include ROUGE and BLEU, as discussed above. A suitable metric can be provided (e.g., selected or determined) for testing and/or validating the trained seq2seq model based on the evaluation. More particular examples of methods for evaluating trained seq2seq models are disclosed below. The results of the evaluation step can be saved, stored, displayed, output, etc. (step 98).

For further illustration, particular example methods employing moment matching will now be discussed. A comparison is made to alternative training methods, such as conventional cross-entropy (CE) training and another method for injecting prior knowledge into seq2seq models (that is, embedding explicit features during training and inference), reinforcement learning (RL).

RL is a general-purpose framework for applying sequential decision making processes. In RL, an agent interacts with an environment ε over a certain number of discrete timesteps. The ultimate goal of the agent is to select any action according to a policy π that maximizes a future cumulative reward. This reward is the objective function of RL guided by the policy π, and is defined specifically for the application task.

Considering the example of seq2seq models for sequences of words, an action (choosing the next word prediction) guided by a stochastic policy (e.g., via a recurrent neural network (RNN) process) receives the task-specific reward with a real value return. The agent tries to maximize the expected reward for T timesteps, e.g., $\mathcal{R} \Sigma_{t=1}^{T} r_t$.

RL has been applied to a variety of neural seq2seq tasks. For instance, Marc'Aurelio Ranzato, Sumit Chopra, Michael Auli, and Wojciech Zaremba, Sequence level training with recurrent neural networks, 2015, CoRR abs/1511.06732 (Ranzato et al. (2015)), discloses applying this idea to abstractive summarization with neural seq2seq models, using the ROUGE evaluation measure as a reward.

Similarly, some success has been achieved for neural machine translation. Ranzato et al. (2015) and Di He, Hanging Lu, Yingce Xia, Tao Qin, Liwei Wang, and Tieyan Liu. 2017, Decoding with value networks for neural machine translation, I. Guyon, U. V. Luxburg, S. Bengio, H. Wallach, R. Fergus, S. Vishwanathan, and R. Garnett, editors, Advances in Neural Information Processing Systems 30, Curran Associates, Inc., pages 178-187 (He et al. (2017)) disclose using BLEU score as value/reward function in their RL setups. Di He, Yingce Xia, Tao Qin, Liwei Wang, Nenghai Yu, Tieyan Liu, and Wei-Ying Ma. 2016. Dual Learning for Machine Translation. In D. D. Lee, M. Sugiyama, U. V. Luxburg, I. Guyon, and R. Garnett, editors, Advances in Neural Information Processing Systems 29, Curran Associates, Inc., pages 820-828 (He et al. (2016)) discloses using a reward interpolating the probabilistic scores from reverse translation and language models.

Example inventive methods herein can exploit a similar general motivation to that of RL, namely, to inject some prior knowledge into a model (e.g., any seq2seq model) which takes the properties of whole (or larger portions of) sequences into consideration. It is preferred that such an injection of prior knowledge, e.g., by using moment matching (MM), be used in alternation with or in combination with cross-entropy (CE) training, including but not limited to conventional CE training. Such an example implementation can be analogous, for instance, to how RL is typically applied in seq2seq models (Ranzato et al., 2015).

One general difference between RL and example inventive methods employing moment matching is that RL assumes that one has defined some reward function $\mathcal{R}$, which is done independently of what the training data informs. By contrast, inventive methods employing moment matching need only assume that one has defined certain features that are deemed important for the task, but then the actual training data can be relied on to inform how to use these features. In other words, the 'arbitrariness' in example moment matching methods can merely be in the choice of the features to focus on, while the arbitrariness in RL is that it is desired for the model to get a good reward, even if that reward is not connected to the training data at all.

Suppose, for instance, that in the context of natural language generation (NLG) one is trying to reconcile several objectives at the same time, such as 1) avoiding omissions of semantic material, 2) avoiding additions of semantic material, and 3) avoiding repetitions, e.g., as disclosed in Shubham Agarwal and Marc Dymetman, 2017, A surprisingly effective out-of-the-box char2char model on the e2e nlg challenge dataset, In Proceedings of the 18th Annual SIGdial Meeting on Discourse and Dialogue, Association for Computational Linguistics, pages 158-163 (Agarwal and Dymetman, 2017). In general, to address this kind of problem in an RL framework, one needs to 'invent' a reward function based on certain computable features of the model outputs, which in particular means inventing a formula for combining the different objectives one has in mind into a single real number. This can be a rather arbitrary process, and potentially it does not guarantee any fit with actual training data. In example inventive methods using moment matching, by contrast, arbitrariness can be in choosing the features to focus on, but subsequently actual training can be used to inform as to what should be done.

Another general difference is that RL tries to maximize a reward, and is only sensitive to the rewards of individual instances, while example methods using moment matching seek to maximize the fit of the model distribution with that of the empirical distribution, where the fit is on specific features. This difference can be particularly clear, for instance, in the case of language modeling (unconditional models), where RL will try to find a model that is strongly peaked on the x (predicted sequence) which has the strongest reward (assuming no ties in the rewards), while an example method using moment matching can instead try to find a distribution over x (predicted sequence) which has certain properties in common with the empirical distribution. For language modeling, RL can be a strange method, because language modeling requires the model to be able to produce different outputs. For machine translation (MT), the situation is a bit less clear, in case one wanted to argue that for each source sentence, there is a single best translation; but in principle, the observation also holds for MT, which is essentially a conditional language model.

Theoretical aspects of an example moment matching framework will now be discussed in more detail. Consider, as a nonlimiting example, the modeling of a seq2seq problem whose goal is to generate an output sequence given an input sequence. In the context of neural machine translation, for instance, the input sequence can be a source language sentence, and the output sequence can be a target language sequence.

Suppose that one is modeling the target sequence $y=y_1, \ldots, y_t, \ldots, y_{|y|}$ given a source sequence $x=x_1, \ldots, x_t, \ldots, x_{|x|}$, by using a certain sequential process $p_\Theta(y|x)$. This sequential process can be implemented via a neural mechanism, e.g., recurrent neural networks within an (attentional) encoder-decoder framework, as disclosed for instance in Dzmitry Bandanau, Kyunghyun Cho, and Yoshua Bengio, 2015, Neural Machine Translation by Jointly Learning to Align and Translate, In Proc. of 3rd International Conference on Learning Representations (ICLR2015) (Bandanau et al., 2015), or within a transformer framework, as disclosed for instance in Ashish Vaswani, Noam Shazeer, Niki Parmar, Jakob Uszkoreit, Llion Jones, Aidan N Gomez, Łukasz Kaiser, and Illia Polosukhin. 2017, Attention is all you need, In I. Guyon, U. V. Luxburg, S. Bengio, H. Wallach, R. Fergus, S. Vishwanathan, and R.

Garnett, editors, Advances in Neural Information Processing Systems 30, Curran Associates, Inc., pages 5998-6008 (Vaswani et al., 2017). Regardless of its implementation, such a neural network depends on a set of model parameters ($\Theta = \theta_1, \ldots, \theta_i, \ldots, \theta_{|\Theta|}$).

In particular example methods, a sequential process is preferably made to satisfy a certain number of moment constraints to reflect desired global or semantic features (collectively referred to as global features). Such moment constraints can be modeled based on features that encode prior (or external) knowledge or semantics about the generated target sequence. Mathematically, features can be represented through vectors, e.g., $\Phi(y|x) \equiv (\phi_1(y|x), \ldots, \phi_j(y|x), \ldots, \phi_m(y|x))$, where $\phi_j(y|x)$ is the $j^{th}$ conditional feature function of a target sequence y given a source sequence x, and m is the number of features or moment constraints.

In order to incorporate such constraints into an example seq2seq learning process, an objective function for representing global loss can be introduced, which function is referred to herein as a moment matching loss $\mathcal{T}_{MM}$. Given a certain vector of features $\Phi(y|x)$ over the sequences, a general goal of moment matching loss is to encourage the identity of a model average estimate $\hat{\Phi}_n(\Theta) \equiv \mathbb{E}_{y \sim p_\Theta(.|x_n)}[\Phi(y|x_n)]$ with an empirical average estimate $\overline{\Phi}_n \equiv \mathbb{E}_{y \sim p_\mathcal{D}(.|x_n)}[\Phi(y|x_n)]$ (where $\mathcal{D}$ is the training data; x, y $\in \mathcal{D}$ are source and target sequences, respectively; n is the data index in $\mathcal{D}$). The example moment matching loss can be formulated in an example method as minimizing a squared distance between the two distributions with respect to model parameters $\Theta$:

$$\mathcal{T}_{MM}(\Theta) := \frac{1}{N}\sum_{n=1}^{N}\|\hat{\Phi}_n(\Theta) - \overline{\Phi}_n\|_2^2 = \frac{1}{N}\sum_{n=1}^{N}\|\mathbb{E}_{y \sim p_\Theta(.|x_n)}[\Phi(y|x_n)] - \mathbb{E}_{y \sim p_\mathcal{D}(.|x_n)}[\Phi(y|x_n)]\|_2^2, \quad (1)$$

Where $\hat{\Phi}_n(\Theta) \equiv \mathbb{E}_{y \sim p_\Theta(.|x_n)}[\Phi(y|x_n)]$ is the model average estimate over the samples which are drawn independent and identically distributed (i.i.d.) from the model distribution $p_\Theta(.|x_n)$ given the source sequence $x_n$, and $\overline{\Phi}_n \equiv \mathbb{E}_{y \sim p_\mathcal{D}}[\Phi(y|x_n)]$ is the empirical average estimate given the $n^{th}$ training instance, where the data are drawn i.i.d. from the empirical distribution $p_\mathcal{D}(.|x)$.

An example moment matching gradient based on the above example moment matching loss function will now be derived. By denoting $\Delta_n \equiv \hat{\Phi}_n(\Theta) - \overline{\Phi}_n$, one can now show how to compute the gradient of each $\|\Delta_n\|_2^2$, mathematically:

$$\Gamma_{\Theta, n} \equiv \nabla_\Theta(\|\Delta_n\|_2^2). \quad (2)$$

Equivalently, it can be said that this is the gradient of the composition F•G of two functions $F(.) = \|.\|_2^2 : \mathbb{R}^m \Delta \mathbb{R}$ and $G(.) = \hat{\Phi}_n(.) - \overline{\Phi}_n : \mathbb{R}^{|\Theta|} \to \mathbb{R}^m$.

Noting that the gradient $\Lambda_\Theta(F \cdot G)$ is equal to the Jacobian $\mathcal{J}_{F \circ G}[\Lambda]$, and applying the chain rule for Jacobians, one can derive:

$$\mathcal{J}_{F \circ G}[\Theta] = (\nabla_\Theta \|\hat{\Phi}_n(\Theta) - \overline{\Phi}_n\|_2^2)[\Theta] = \mathcal{J}_F[G(\Theta)] \cdot \mathcal{J}_G[\Theta] \quad (3)$$

Next, the computation for $\mathcal{J}_F[G(\Theta)]$ and $\mathcal{J}_G[\Theta]$ in equation (3) is provided. First:

$$\mathcal{J}_F[G(\Theta)] = 2(\hat{\phi}_{n,1}(\Theta) - \overline{\phi}_{n,1}, \ldots, \hat{\phi}_{n,j}(\Theta) - \overline{\phi}_{n,j}, \ldots, \hat{\phi}_{n,m}(\Theta) - \overline{\phi}_{n,m}), \text{ and}$$

$$\mathcal{J}_G[\Theta] = \begin{pmatrix} \frac{(\partial \mathbb{E}_{y \sim p_\Theta(.|x_n)}[\phi_1(y|x_n) - \phi_{n,1}])}{(\partial \theta_1)} & \cdots & \frac{(\partial \mathbb{E}_{y \sim p_\Theta(.|x_n)}[\phi_1(y|x_n) - \overline{\phi}_{n,1}])}{(\partial \theta_{|\Theta|})} \\ \cdots & \frac{(\partial \mathbb{E}_{y \sim p_\Theta(.|x_n)}[\phi_j(y|x_n) - \overline{\phi}_{n,j}])}{(\partial \theta_i)} & \cdots \\ \frac{(\partial \mathbb{E}_{y \sim p_\Theta(.|x_n)}[\phi_m(y|x_n) - \overline{\phi}_{n,m}])}{(\partial \theta_1)} & \cdots & \frac{(\partial \mathbb{E}_{y \sim p_\Theta(.|x_n)}[\phi_m(y|x_n) - \phi_{n,m}])}{(\partial \theta_{|\Theta|})} \end{pmatrix} \quad (5)$$

To compute the value of the term $$\frac{\partial \mathbb{E}_{y \sim p_\Theta(.|x_n)}[\phi_j(y|x_n) - \overline{\phi}_{n,j}]}{\partial \theta_i}$$

in the identities in equation (5), the term is re-implemented as follows:

$$\frac{\partial \mathbb{E}_{y \sim p_\Theta(.|x_n)}[\phi_j(y|x_n) - \overline{\phi}_{n,j}]}{\partial \theta_i} = \frac{\partial \sum_y p_\Theta(y|x_n)(\phi_j(y|x_n) - \overline{\phi}_{n,j})}{\partial \theta_i} = \sum_y (\phi_j(y|x_n) - \overline{\phi}_{n,j}) \frac{\partial p_\Theta(y|x_n)}{\partial \theta_i} \quad (6)$$

Next, applying a "log-derivative trick":

$$\frac{\partial \log p_\Theta(y|x)}{\partial \theta_i} = \frac{1}{p_\Theta(y|x)} \frac{\partial p_\Theta(y|x)}{\partial \theta_i}$$

e.g., from the Policy Gradient technique in reinforcement learning disclosed in Richard S. Sutton and Andrew G. Barto, 1998, Reinforcement learning: An introduction. IEEE Transactions on Neural Networks 16:285-286 (Sutton et al., 2000), one can rewrite the above as follows:

$$\frac{\partial \mathbb{E}_{y \sim p_\Theta(.|x_n)}[\phi_j(y|x_n) - \overline{\phi}_{n,j}]}{\partial \theta_i} = \sum_y (\phi_j(y|x_n) - \overline{\phi}_{n,j}) p(y|x_n) \frac{\partial \log p_\Theta(y|x_n)}{\partial \theta_i} = \mathbb{E}_{y \sim p_\Theta(.|x_n)}\left[(\phi_j(y|x_n) - \overline{\phi}_{n,j}) \frac{\partial \log p_\Theta(y|x_n)}{\partial \theta_i}\right]. \quad (7)$$

Combining equations (6) and (7) provides:

$$\frac{\partial \mathbb{E}_{y \sim p_\Theta(\cdot | x_n)} [\phi_j(y|x_n) - \overline{\phi}_{n,j}]}{\partial \theta_i} =$$

$$\mathbb{E}_{y \sim p_\Theta(\cdot | x_n)} \left[ (\phi_j(y|x_n) - \overline{\phi}_{n,j}) \frac{\partial \log p_\Theta(y|x_n)}{\partial \theta_i} \right].$$

And thus in turn one obtains the computation of $\mathcal{J}_G[\Theta]$. Since the computations of $\mathcal{J}_F[G(\Theta)]$ and $\mathcal{J}_G[\Theta]$ are known, one can finalize the gradient computation $\Gamma_{\Theta,n}$ as follows:

$$\Gamma_{\Theta,n} = 2\big(\hat{\phi}_{n,1}(\Theta) - \overline{\phi}_{n,1}, \ldots, \hat{\phi}_{n,j}(\Theta) - \overline{\phi}_{n,j}, \ldots, \hat{\phi}_{n,m}(\Theta) - \overline{\phi}_{n,m}\big)$$

$$\cdot \left( \begin{array}{c} \cdots \\ \cdots \mathbb{E}_{y \sim p_\Theta(\cdot | x_n)} \left[ (\phi_j(y|x_n) - \overline{\phi}_{n,j}) \frac{\partial \log p_\Theta(y|x_n)}{\partial \theta_i} \right] \cdots \\ \cdots \end{array} \right)$$

$$= 2\big(\hat{\phi}_{n,1}(\Theta) - \overline{\phi}_{n,1}, \ldots, \hat{\phi}_{n,j}(\Theta) - \overline{\phi}_{n,j}, \ldots, \hat{\phi}_{n,m}(\Theta) - \overline{\phi}_{n,m}\big)$$

$$\cdot \left[ \sum_y p_\Theta(y|x_n) \left( \begin{array}{c} \cdots \\ \cdots (\phi_j(y|x_n) - \overline{\phi}_{n,j}) \frac{\partial \log p_\Theta(y|x_n)}{\partial \theta_i} \cdots \\ \cdots \end{array} \right) \right] =$$

$$2\sum_y p_\Theta(y|x_n)(\hat{\phi}_{n,1}(\Theta) - \overline{\phi}_{n,1}, \ldots, \hat{\phi}_{n,j}(\Theta) - \overline{\phi}_{n,j}, \ldots, \hat{\phi}_{n,m}(\Theta) - \overline{\phi}_{n,m}).$$

$$\left( \begin{array}{c} \cdots \\ (\phi_j(y|x_n) - \overline{\phi}_{n,j}) \frac{\partial \log p_\Theta(y|x_n)}{\partial \theta_i} \\ \cdots \end{array} \right) = 2 \sum_y p_\Theta(y|x_n) \langle \hat{\phi}_n(\Theta) - \overline{\phi}_n, \Phi(y|x_n) - \overline{\phi}_n \rangle \nabla_\Theta \log p_\Theta(y|x_n).$$

Finally, by the reasoning immediately above, it can be seen that the gradient for each individual expression $\|\Delta_n\|_2^2$ in equation (1) is:

$\Gamma_{\Theta,n} = 2\sum_y p_\Theta(y|x_n) \langle \hat{\phi}_n(\Theta) - \overline{\phi}_n, \Phi(y|x_n) - \overline{\phi}_n \rangle \nabla_\Theta \log$
$p_\Theta(y|x_n) = 2 \mathbb{E}_{y \sim p_\Theta(\cdot|x_n)} [\langle (\hat{\phi}_n(\Theta) - \overline{\phi}_n, \Phi(y|x_n)$
$-\overline{\phi}_n \rangle \nabla_\Theta \log p_\Theta(y|x_n)].$  (8)

Therefore, the total gradient for the example moment matching loss $\mathcal{J}_{MM}(\Theta)$ in equation (1) is:

$$\Gamma_{\Theta,\mathcal{J}} = \frac{1}{N} \sum_n \Gamma_{\Theta,n},$$

which provides a central formula for the example moment matching technique.

Based on equation (8) above and ignoring the constant factor 2, one can use as a gradient update, for each pair $(x_n, y_j \sim p_\Theta(\cdot|x_n))$ ($j \in [1,J]$), the value $\langle \hat{\phi}_{n,y}(\Theta) - \overline{\phi}_n, \Phi(y|x_n) - \overline{\phi}_n \rangle \nabla_\Theta \log p_\Theta(y|x_n)$,
where $\langle \hat{\phi}_{n,y}(\Theta) - \overline{\phi}_n, \Phi(y|x_n) - \overline{\phi}_n \rangle$ provides a multiplication score and $\nabla_\Theta \log p_\Theta(y|x_n)$ provides a standard gradient update, and further where $\overline{\phi}_n$, the empirical average of $\Phi(\cdot|x_n)$, can be estimated through the observed value $y_n$, i.e., $\overline{\phi}_n \cong \Phi(y_n|x_n)$.

The above gradient update exhibits some similarities to an RL with policy gradient method, as disclosed in Richard S Sutton, David A. McAllester, Satinder P. Singh, and Yishay Mansour, 2000, Policy gradient methods for reinforcement learning with function approximation, in S. A. Solla, T. K. Leen, and K. Müller, editors, Advances in Neural Information Processing Systems 12, MIT Press, pages 1057-1063 (Sutton et al., 2000), where the 'multiplication score' plays a similar role to the reward R(y|x). However, unlike such RL training, which uses a predefined reward, in example methods using MM training, MM's multiplication score does depend on the model parameters $\Theta$ and looks at what the empirical data tells the model via using explicit prior features.

Table 1 below illustrates example differences among cross-entropy (CE), reinforcement learning (RL) with policy gradient (PG), and an example moment matching (MM)-based method, for neural seq2seq models in both unconditional (e.g., language modeling) and conditional (e.g., NMT, summarization) cases.

| Method | Formulation | Note |
|---|---|---|
| *Unconditional Case* | | |
| CE | $\nabla_\Theta \log p_\Theta(y)$ | $y \sim \mathcal{D}$ |
| RL w/PG | $\mathcal{R}(y) \nabla_\Theta \log p_\Theta(y)$ | $y \sim p_\Theta(\cdot)$ |
| MM | $\langle \hat{\Phi}(\Theta) - \overline{\Phi}, \Phi(y) - \overline{\Phi} \rangle \nabla_\Theta \log p_\Theta(y)$ | $y \sim p_\Theta(\cdot)$ |
| *Conditional Case* | | |
| CE | $\nabla_\Theta \log p_\Theta(y|x)$ | $x, y \sim \mathcal{D}$ |
| RL w/PG | $\mathcal{R}(y) \nabla_\Theta \log p_\Theta(y|x)$ | $x \sim \mathcal{D}, y \sim P(\cdot|x)$ |
| MM | $\langle \hat{\Phi}(\Theta) - \overline{\Phi}, \Phi(y|x) - \overline{\Phi} \rangle \nabla_\Theta \log p_\Theta(y|x)$ | $x \sim \mathcal{D}, y \sim P(\cdot|x)$ |

With the gradient of moment matching loss being derived as shown in equation (8) above, in order to compute it, two estimates are employed, namely model average estimate $\hat{\phi}_n(\Theta)$ and empirical average estimate $\overline{\phi}_n$.

To provide the empirical average estimate $\overline{\phi}_n$, suppose that in the general case, given a source sequence $x_n$, there are multiple target sequences $y \in \mathcal{Y}$ associated with $x_n$, then $$\overline{\phi}_n \equiv \frac{1}{|\mathcal{Y}|} \Sigma_{y \in \mathcal{Y}} \phi(y|x_n).$$

More specifically, when one has only one reference sequence y per source sequence $x_n$, then $\overline{\phi}_n \equiv \phi(y|x_n)$, which is the standard case in the context of neural machine translation training (NMT).

$\Gamma_{\Theta,n}$ can then be estimated by a sampling process. There are several options for doing this. A first, simplistic approach is to:

First, estimate the model average $\hat{\phi}_n(\Theta)$ by sampling, say, K values of y as $y_1, y_2, \ldots, y_K$ and then estimate:

$$\hat{\phi}_n(\Theta) \approx \frac{1}{K} \sum_{k \in [1,K]} \Phi(y_k | x_n).$$

Next, estimate the expectation $\mathbb{E}_{y \sim p_\Theta}$ in equation (8) by independently sampling, say, J values of y, and then estimate:

$$\Gamma_{\Theta,n} \approx \frac{1}{J} \sum_{j \in [1,J]} \langle \hat{\phi}_n(\Theta) - \overline{\phi}_n, \Phi(y_j | x_n) - \overline{\phi}_n \rangle \nabla_\Theta \log p_\Theta(y_j | x_n).$$

This provides an unbiased estimate of $\Gamma_{\Theta,n}$, but at the cost of producing two independent sample sets of sizes K and J, used for two different purposes, which would be computationally wasteful.

Another, more economical approach uses the same sample set of size J for both purposes. However, this would produce a biased estimate of $\Gamma_{\Theta,n}$. This can be illustrated by considering the estimate case with J=1. In this example case, the dot product $\langle \hat{\Phi}_n(\Theta) - \overline{\Phi}_n, \Phi(y_1|x_n) - \overline{\Phi}_n \rangle$ in $\Gamma_{\Theta,n}$ is strictly positive (never negative) (since $\hat{\Phi}_n(\Theta)$) is equal to $\Phi(y_1|x_n)$), leading to the current sample y to be systematically discouraged.

In another example method, an unbiased estimate of $\Gamma_{\Theta,n}$ is formulated as follows. First, J values of y: $y_1, y_2, \ldots, y_K$ are sampled, with J≥2. Then, $\Gamma_{\Theta,n}$ is estimated as:

$$\Gamma_{\Theta,n} \approx \frac{1}{J} \sum_{j \in [1,J]} \langle \hat{\Phi}_{n,j}(\Theta) - \overline{\Phi}_n, \Phi(y_j|x_n) - \overline{\Phi}_n \rangle \nabla_\Theta \log p_\Theta(y_j|x_n) \quad (9)$$

where $$\hat{\Phi}_{n,j}(\Theta) \equiv \frac{1}{J-1} \sum_{\substack{j' \in [1,J] \\ j' \neq j}} \Phi(y_{j'}|x_n). \quad (10)$$

This computation can be shown to provide an unbiased estimated of $\Gamma_{\Theta,n}$, while avoiding the need to produce two independent sample sets (e.g., of sizes K and J as in the above example) using the model, which adds computational expense. In this example method, the same overall set of J samples can be exploited in general for both purposes, e.g., for computing the estimate of the model expectation, such as in equation (10) above, and for estimating the gradient loss of moment matching, such as in equation (9) above, using the computed estimate, but the example method does not exploit the exact same $y_j$ for both purposes at the same time. Instead, at each point where a particular $y_j$ among the set of J values is used for the purpose of estimating the expectation $\Gamma_{\Theta,n}$ in equation (9), one takes care not to exploit the same $y_j$ when computing an estimate of the model expectation in equation (10). Instead, a subset of the J values excluding $y_j$ can be used for estimating the model expectation.

To illustrate unbiasedness of the above, and considering the unconditional case (e.g., p(.) instead of p(.|x)) (the conditional case follows easily), the following lemma can be established (proof omitted herein):

Let p(.) be a probability distribution over y, and let $\zeta(y)$ be any function of y.

Recall that $\Phi(y)$ is a feature vector over y. It is desired to compute the quantity $\mathcal{A} = \mathbb{E}_{y \sim p(.)}[\langle \hat{\Phi}, \Phi(y) \rangle \zeta(y)]$, where $\hat{\Phi} \equiv \mathbb{E}_{y \sim p(.)}[\Phi(y)]$.

Sample J sequences $y_1, y_2, \ldots, y_J$ (where J is a predefined number of generated samples) independently from p(.) and compute:

$$\mathcal{B}(y_1, y_2, \ldots, y_J) \equiv \frac{1}{J}\left[\langle \hat{\Phi}^{(-1)}, \Phi(y_1) \rangle \zeta(y_1) + \ldots + \langle \hat{\Phi}^{(-J)}, \Phi(y_J) \rangle \zeta(y_J)\right],$$

Where $\hat{\Phi}^{(-i)}$ is the abbreviation:

$$\hat{\Phi}^{(-i)} \equiv \frac{1}{J-1}[\Phi(y_1) + \ldots + \Phi(y_{i-1}) + \Phi(y_{i+1}) + \ldots + \Phi(y_J)].$$

Then, one has:

$$\mathcal{A} = \mathbb{E}_{\substack{y_1 \sim p(.) \\ \vdots \\ y_J \sim p(.)}} \mathcal{B}(y_1, y_2, \ldots, y_J),$$

In other words, $\mathcal{B}(y_1, y_2, \ldots, y_J)$ provides an unbiased estimate of $\mathcal{A}$.

Considering the above lemma intuitively, consider the case where $p = p_\Theta$ and $\zeta(y) = \nabla_\Theta \log p_\Theta(y)$. Then, the quantity $\mathcal{A} = \mathbb{E}_{y \sim p(.)}[\langle \hat{\Phi}, \Phi(y) \rangle \zeta(y)]$ is equal (by the formula in equation (8) obtained above, and up to a constant factor) to the overall gradient of the example MM loss, for a given value of the model parameters $\Theta$. It is then desired to obtain an unbiased stochastic gradient estimator of this gradient, that is, an unbiased estimator of the quantity $\mathcal{A}$.

By the above lemma, $\mathcal{A}$ is equal to the expectation of $\mathcal{B}(y_1, y_2, \ldots, y_J)$, where $y_1, y_2, \ldots, y_J$ are drawn i.i.d. from distribution p. In other words, if one samples one set of J samples from p, and computes $\mathcal{B}(y_1, y_2, \ldots, y_J)$, where $y_1, y_2, \ldots, y_J$ on this set, then an unbiased estimate of $\mathcal{A}$ is obtained. As a result, one obtains an unbiased estimate of the gradient of the overall MM loss, which can then be used in the above example methods.

In principle, therefore, one needs to first sample $y_1, y_2, \ldots, y_J$, and to compute $$\mathcal{B}(y_1, y_2, \ldots, y_J) \equiv$$
$$\frac{1}{J}\left[\langle \hat{\Phi}^{(-1)}, \Phi(y_1) \rangle \nabla_\Theta \log p_\Theta(y_1) + \ldots + \langle \hat{\Phi}^{(-J)}, \Phi(y_J) \rangle \nabla_\Theta \log p_\Theta(y_J)\right],$$

and then use this quantity as the stochastic gradient. In a typical implementation, one first samples $y_1, y_2, \ldots, y_J$, and then uses (in a mini-batch way) the components of the sum:

$$\langle \hat{\Phi}^{(-j)}, \Phi(y_j) \rangle \nabla_\Theta \log p_\Theta(y_j)$$

as the individual stochastic gradients. Note that this computation differs from the original one by a constant factor $$\frac{1}{J},$$

which can be neutralized by manipulating the learning rate.

As stated above, a goal of example methods using moment matching is to preserve certain aspects of generated target sequences according to prior knowledge. In principle, such an example technique may not necessarily teach the model how to generate a proper target sequence based on the given source sequence (Ranzato et al., 2015). Accordingly, an example method for training based on a consideration of global loss preferably is used along with local-loss training, such as CE training (e.g., standard CE training) of seq2seq models. As explained above, these methods can be combined in various ways.

Two particular example training modes, referred to generally herein as alternation and interpolation, are disclosed for combining local loss-based training (CE training) and global loss-based training (MM). For the example alternation mode, the seq2seq model is trained alternatively using both CE loss and moment matching loss. More specifically, the seq2seq model is initially trained with CE loss for some iterations, then switches to using moment matching loss, and vice versa. For the interpolation mode, the model is trained with the interpolated objective using two losses with an additional hyper-parameter balancing them.

An example combined algorithm incorporating a selection between both training modes is shown below. After some iterations of the algorithm, one can approximate $\mathcal{L}_{MM}$ over the development data (or sampled training data) through:

$$\mathcal{L}_{MM}^{dev}(\Theta) \approx \frac{1}{N}\sum_{n=1}^{N}\|\hat{\Phi}_n^{approx}(\Theta) - \overline{\Phi}_n\|_2^2. \tag{11}$$

$\mathcal{L}_{MM}$ is expected to decrease over iterations, potentially improving the explicit evaluation measure(s), e.g., BLEU (Papineni et al., 2002) in NMT.

Example Combined Algorithm for Training with Moment Matching

```
1:    Input: a pre-trained model Θ, parallel training data 𝒟, λ is balancing
factor in interpolation training mode if used
2:       for step = 1, . . . , M do (M is maximum number of steps)
3:          Select a batch of size N source and target sequences in X and Y in
𝒟.
4:          if MM mode is required then
5:             Sample J translations for the batch of source sequences X
(random sampling is used).
6:             Compute the total MM gradients according to Γ_{Θ,n}^{MM} =
𝔼_{y~p_Θ(·|x_n)} [(Φ̂_{n,y}(Θ) - Φ̄_{n'} Φ(y|x_n) - Φ̄_n) ∇_Θ log p_Θ (y|x_n)] in equations (9)
and (10) above.
7:          if alternation mode then
8:             if MM mode then
9:                Update model parameters according to the defined
MM gradients Γ_{Θ,n}^{MM} with SGD.
10:               else if CE mode then
11:                  Update model parameters according to standard CE
based gradients Γ_{Θ,n}^{CE} = 𝔼_{x~X, y~Y} [∇_Θ log p_Θ (y|x)] with SGD as usual.
12:            else    (interpolation mode)
13:               Compute the standard CE based gradients Γ_{Θ,n}^{CE} =
𝔼_{x~X, y~Y}[∇ log p_Θ (y|x)].
14.               Update model parameters according to Γ_{Θ,n}^{interpolation} =
Γ_{Θ,n}^{CE} + λΓ_{Θ,n}^{MM}.
15.            After some steps, save model parameters w.r.t. best score based on
ℒ_{MM}^{dev} using equation (11).
16.      return newly-trained model Θ_{new}.
```

Example MM methods provided have some similarities with the technique of Maximum Mean Discrepancies (MMD), a technique that has been successfully applied to computer vision, e.g., an alternative to learning generative adversarial network, as disclosed in Yujia Li, Kevin Swersky, and Richard Zemel. 2015, Generative moment matching networks, in Proceedings of the 32Nd International Conference on International Conference on Machine Learning—Volume 37. JMLR.org, ICML'15, pages 1718-1727 (Li et al., 2015); and in Chun-Liang Li, Wei-Cheng Chang, Yu Cheng, Yiming Yang, and Barnabas Poczos, 2017, MMD GAN: Towards deeper understanding of moment matching network, in I. Guyon, U. V. Luxburg, S. Bengio, H. Wallach, R. Fergus, S. Vishwanathan, and R. Garnett, editors, Advances in Neural Information Processing Systems 30, Curran Associates, Inc., pages 2203-2213 (Li et al., 2017). The MMD is a way to measure discrepancy between two distributions (for example, the empirical distribution and the model distribution) based on kernel-based similarities. The use of such kernels as disclosed in Li et al. 2015 and Li et al. 2017 can be useful to extend example MM-based methods, which can be seen as using a simple linear kernel over predefined features, but in the specific context of seq2seq models, and in tandem with a generative process based on an autoregressive generative model.

As another example comparison, Suman Ravuri, Shakir Mohamed, Mihaela Rosca, and Oriol Vinyals. 2018, Learning implicit generative models with the method of learned moments, In Jennifer Dy and Andreas Krause, editors, Proceedings of the 35th International Conference on Machine Learning, PMLR, Stockholmsmssan, Stockholm Sweden, volume 80 of Proceedings of Machine Learning Research, pages 4314-4323 (Ravuri et al. (2018)) discloses using a moment matching technique in situations where Maximum Likelihood is difficult to apply. However, this prior technique defines functions parameterized by some parameters, and lets them be learned along with model parameters.

In this way, the method disclosed in Ravuri et al., 2018 attempts to apply the method of moments to situations in which ML (maximum likelihood, or CE) is not applicable, but where an example MM-based method can find the correct model distribution on its own. Hence, the focus on having (and learning) a large number of features, because only many features will allow one to approximate the actual distribution.

By contrast, example methods herein do not need to rely on MM to model the target distribution on its own, which can be prohibitive, for instance, when only a small number of features are employed. Instead, example methods use MM to complement ML, in such a way that task-related important features are attended to even if that means obtaining a (slightly) worse likelihood (=perplexity) on the training set. An example use of MM as provided herein can thus be considered a form of regularization technique for complementing ML training (MLE, CE), which is a significant benefit of example methods.

Experiments

In an illustrative operation of example methods, two prior features used for training NMT were re-applied as disclosed in Jiacheng Zhang, Yang Liu, Huanbo Luan, Jingfang Xu, and Maosong Sun. 2017, Prior knowledge integration for neural machine translation using posterior regularization, in Proceedings of the 55th Annual Meeting of the Association for Computational Linguistics (Volume 1: Long Papers), Association for Computational Linguistics, pages 1514-1523 (Zhang et al., 2017), including source and target length ratio and lexical bilingual features. Zhang et al. (2017) showed in their experiments that these two are the most effective features for improving NMT systems.

The first example feature is straightforward, namely a ratio between source and target length. This feature aims at forcing the example model to produce translations with consistent length ratio between source and target sentences, in such a way that too short or too long translations will be avoided. Given the respective source and target sequences x and y, the source and target length ratio feature function $\Phi_{len-ratio}$ can be defined as follows:

$$\Phi_{len-ratio} := \begin{cases} \frac{\beta * |x|}{|y|} & \text{if } \beta * |x| < |y| \\ \frac{|y|}{\lceil \beta * |x| \rceil} & \text{otherwise} \end{cases} \quad (12)$$

Where β is an additional hyper-parameter, normally set empirically based on prior knowledge about source and target languages. In this example, the feature function is a real value.

The second example feature used is based on a word-to-word lexical translation dictionary produced by an off-the-shelf SMT system (e.g., Moses, https://github.com/moses-smt/mosesdecoder). The goal of this example feature is to ask the model to take external lexical translations into consideration. This feature can be useful, for instance, in cases such as translation for rare words, and in low resource setting in which parallel data can be scarce. Following Zhang et al. (2017), sparse feature functions can be defined as:

$$\Phi_{bd} \equiv [\phi_{\langle w_{x_1}, w_{y_1}\rangle}, \ldots, \phi_{\langle w_{x_i}, w_{y_j}\rangle}, \ldots, \phi_{\langle w_{x_{T_{lex}}}, w_{y_{T_{lex}}}\rangle}],$$

where:

$$\phi_{\langle w_x, w_y\rangle} := \begin{cases} 1 & \text{if } w_x \in x \wedge w_y \in y \\ 0 & \text{otherwise} \end{cases},$$

and where $\mathcal{D}_{lex}$ is a lexical translation dictionary produced by Moses.

The example method was validated with small-scale experiments. The IWSLT'15 dataset was used, translating from English to Vietnamese. This dataset is relatively small, containing approximately 133K sentences for training, 1.5K for development, and 1.3K for testing. The transformer architecture disclosed in Vaswani et al. (2017) was implemented for training the example NMT model with hyper-parameters: 4 encoder and 4 decoder layers; hidden dimension 512 and dropout probability 0.1 through the network. For the sampling process, 5 samples were generated for each moment matching training step. Interpolation training mode was used with a balancing hyper-parameter of 0.5. For the feature with length ratio between source and target sequences, the length factor β=1 was used. The bilingual lexical dictionary feature was extracted by Moses's training scripts. In this dictionary, the bad entries with lexical probability less than 0.5 were filtered out as disclosed by example in Zhang et al. (2017).

The results of evaluation scores for training using an example MM-based method with length ratio between source and target sequences are shown in Table 2 below. Evaluation scores for training using the example MM-based method with bilingual lexical dictionary are shown in Table 3 below.

TABLE 2

Evaluation scores for training moment matching with length ratio between source and target sequences

|  | BLEU | MM Loss |
| --- | --- | --- |
| tensor2tensor | 27.69 | — |
| base (ours) | 28.53 | 0.0094808 |
| base + mm | 29.17[†] | 0.0068775 |

TABLE 3

Evaluation scores for training moment matching with bilingual lexical dictionary

|  | BLEU | MM Loss |
| --- | --- | --- |
| tensor2tensor | 27.69 | — |
| base (ours) | 28.53 | 0.7384 |
| base + mm | 29.11[†] | 0.7128 |

As can be seen in Tables 2 and 3, as long as the example model attempted to reduce the moment matching loss, the BLEU scores (Papineni et al., 2002) improved statistically significantly with p<0.005, e.g., as disclosed in Philipp Koehn. 2004. Statistical Significance Tests for Machine Translation Evaluation, in Dekang Lin and Dekai Wu, editors, Proceedings of Conference on Empirical Methods on Natural Language Processing (EMNLP). Association for Computational Linguistics, Barcelona, Spain, pages 388-395 (Koehn, 2004). This consistently happened in both experiments, providing encouraging preliminary validation of example training techniques employing moment matching. Such experiments demonstrate favorable properties of example moment matching training, such as, but not limited to, unbiasedness.

The above experiments illustrate effectiveness of using MM-based methods to improve systems such as but not including existing NMT systems, even when considering relatively simple prior features. Example methods can be particularly useful for applications such as, but not limited to, neural machine translation (NMT), natural language generation (NLG), and summarization.

For instance, a significant problem with conventional seq2seq models for text is that they have difficulties in controlling certain important global properties of the generated texts. For example, they typically do not distinguish between the loss incurred by the model choosing a slightly different wording than the reference or the model choosing to ignore a negation present in the reference. Example methods using moment matching as provided herein can help address such issues, for example in the context of translating user-generated reviews (e.g., of points of interest (POIs)), where it is crucial to maintain certain global semantic properties of the original review, such as the opinions expressed on different aspects.

Figure 5:
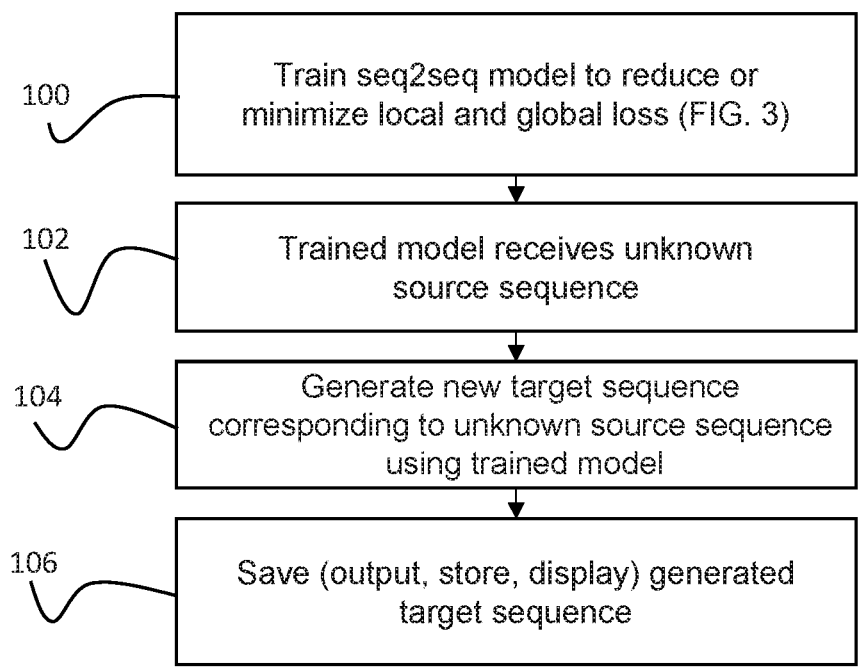
FIG. 5 shows steps in an example inference method using a trained seq2seq model according to an inventive embodiment.

FIG. 5 shows steps in an example inference method using a trained seq2seq model according to an inventive embodiment. Additional methods and systems are provided herein for generating a target sequence from a source sequence. A neural sequence-to-sequence (seq2seq) model is trained using a processor according to any of the above methods. A seq2seq model is trained (step 100) using one or more example methods disclosed herein to reduce or minimize local and global loss.

To perform an inference method, the trained seq2seq model executed by the processor receives an unknown source sequence into the trained model (step 102). For instance, the unknown source sequence can originate from any of the computing devices disclosed herein. This can occur, for instance, during operating of a method performed by an application including a framework having the trained seq2seq model.

The new target sequence is generated using the trained seq2seq model (step 104). The generated target sequence can then be saved (step 106), e.g., in the memory 50 (or other storage, e.g., non-transitory storage) for use in additional steps for processing the generated target sequence based on a particular application (if desired), saved in storage, or saved in other ways. Alternatively or additionally, the generated target sequence and/or results of further processing of the generated target sequence can be output, for instance to a computing device (e.g., another computer, the mobile communication device 30, the client 28) over the communication link (e.g., bus 38, communication interface 26). Such output can include displaying the target sequence on a display of the computing device, outputting sounds on a speaker of the computing device, communicating the target sequence to the computing device for storage or for additional processing of the generated target sequence by the computing device, printing the target sequence, etc.

A person of ordinary skill in the art would understand that example methods described herein may be implemented in the processor by one or more modules described herein as well any other additional modules such that a person of ordinary skill in the art may refer to such embodiments as an application platform. Further, the modules and functions thereof may be combined or separated. In addition, such modules can be separated and portions thereof may be implemented across many devices or combined into one device.

Persons of ordinary skill in the art will understand that embodiments of example methods may include a subset of the steps shown and described in the figures, and the order of the steps may be rearranged. Further, additional steps may be implemented by the method before, after, and in between the steps shown and described. In addition, the steps of example methods may be implemented by one or more modules executed by processors as described herein.

Processors may be co-located with each other or may be located in one module or in different parts of a computer, or among a plurality of computing devices. The memory may include one or more storage devices that may be co-located with each other or may be located in one module, in different parts of a computer or among a plurality of computer. An intra-device communication link between processor(s), memory device(s), modules, antennas, and communication interfaces may be one of several types that include a bus or other communication mechanism.

The modules disclosed herein may be implemented by the processor (which, again, may include one or more physical or virtual processors). Further, the modules and functions thereof may be combined or separated. In addition, such modules can be separated and portions thereof may be implemented across many devices or combined into one device.

Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Also, in the foregoing description, numerous details are set forth to further describe and explain one or more embodiments. These details include any system configurations, block module diagrams, flowcharts (including transaction diagrams), and accompanying written description. While these details are helpful to explain one or more embodiments of the disclosure, those skilled in the art will understand that these specific details are not required in order to practice the embodiments.

As will be appreciated by one skilled in the art, aspects of the present disclosure may be embodied as an apparatus that incorporates some software components. Accordingly, some embodiments of the present disclosure, or portions thereof, may combine one or more hardware components such as microprocessors, microcontrollers, or digital sequential logic, etc., such as a processor, or processors, with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein as modules. The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, mobile devices and the like. A given module may even be implemented such that the described functions are performed by separate processors and/or computing hardware platforms.

It will be appreciated that some embodiments may be comprised of one or more generic or specialized processors (such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, circuits, and process steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in various ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the embodiments discloses herein may be embodied directly in hardware, in a software module executed by a processor, or in a combination of the two. A software module may reside in RAM memory, flash memory, ROM memory, EPROM memory, EEPROM memory, registers, hard disk, solid state disk, optical media (e.g., CD-ROM), or any other form of transitory or non-transitory storage medium known in the art. An exemplary storage medium can be coupled to the processor such that the processor can read information from, and write information to, the storage medium. In the alternative, the storage medium can be integral to the processor. The processor and the storage medium may reside in an ASIC. The ASIC may reside in a user terminal. In the alternative, the processor and the storage medium may reside as discrete components in a user terminal.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for training a neural sequence-to-sequence (seq2seq) model using a processor, the neural seq2seq model being configured to receive an input source sequence and output a predicted target sequence based on one or more model parameters, the method comprising:
receiving, by the processor, the neural seq2seq model and training data, the training data comprising a plurality of training source sequences and a corresponding plurality of training target sequences;
generating, by the processor using the neural seq2seq model, a plurality of predicted target sequences corresponding to the plurality of training source sequences;
updating the model parameters based on a comparison of the generated plurality of predicted target sequences to the corresponding plurality of training target sequences to reduce or minimize a local loss in the predicted target sequences and to minimize or reduce a distance between an expectation of one or more predefined global or semantic features or constraints in the predicted target sequences and an expectation of the one or more predefined global or semantic features or constraints in the training target sequences given the training source sequences; and
saving in a memory the updated model parameters for the neural seq2seq model to provide a trained neural seq2seq model.

2. The method of claim 1, wherein the local loss comprises a cross-entropy (CE) loss of a predicted next token in the predicted target sequence.

3. The method of claim 1, wherein the one or more predefined global or semantic features or constraints are stored prior to training the neural seq2seq model.

4. The method of claim 1, wherein the neural seq2seq model uses a sequential process implemented via a neural mechanism that comprises a recurrent neural network.

5. The method of claim 1, wherein the training source sequence comprises a first sequence of tokens, wherein the training target sequence comprises a second sequence of tokens, and wherein the predicted target sequence comprises a third sequence of tokens.

6. The method of claim 5, wherein the tokens in the first sequence, the second sequence, and the third sequence are selected from the group consisting of words, words and characters, characters, images, and sounds.

7. The method of claim 1, wherein the nueral seq2seq model comprises a conditional model that comprises one or more of a neural machine translation model, a captioning model, or a summarization model.

8. The method of claim 1, wherein the neural seq2seq model comprises an unconditional model.

9. The method of claim 1, wherein the one or more predefined global or semantic features or constraints encode prior knowledge or semantics about the training target data.

10. The method of claim 1, wherein the one or more predefined global or semantic features or constraints are defined using one or more feature functions.

11. The method of claim 10, wherein the one or more feature functions comprise conditional feature functions of the training target sequence given the corresponding training source sequence.

12. The method of claim 10, wherein the one or more feature functions comprise a function representing one of: a relative quantity of repeated tokens or repeated sets of tokens, a relative quantity of tokens, a relative quantity of selected attributes of one or more tokens, a biasedness determined based upon an external evaluation, and a presence or omission of one or more semantic features.

13. The method of claim 1, wherein the one or more model parameters comprise one of: weights input to nodes of the neural seq2seq model.

14. The method of claim 1, wherein said updating comprises updating the model parameters to reduce or minimize a difference between a model average estimate based on a distribution of the corresponding predicted target sequences and an empirical average estimate based on a distribution of the corresponding training target sequences, wherein the model average estimate and the empirical average estimate are each based on a mathematical representation of the one or more predefined global or semantic features or constraints.

15. The method of claim 1, wherein said updating comprises:
  computing, by the processor, total moment matching gradients over a portion of the generated plurality of predicted target sequences and a corresponding portion of the plurality of training target sequences, the one or more predefined global or semantic features or constraints being represented by one or more conditional feature functions.

16. The method of claim 1, wherein said updating comprises:
  computing, by the processor, total moment matching gradients over a first portion of the generated plurality of predicted target sequences and a corresponding first portion of the plurality of training target sequences, the one or more predefined global or semantic features or constraints being represented by one or more conditional feature functions;
  computing, by the processor, cross-entropy-based (CE-based) based gradients for a second portion of the plurality of generated predicted target sequences and a corresponding second portion of the plurality of training target sequences; and
  updating, by the processor, the one or more model parameters based on the computed total moment matching gradients and the computed CE-based gradients.

17. The method of claim 16, wherein said computing the total moment matching gradients comprises determining a distance between expectations of the one or more predefined global or semantic features or constraints over the first portion of generated predicted target sequences and over the corresponding first portion of training target sequences.

18. The method of claim 16, wherein said computing the total moment matching gradients comprises:
  determining a score based on a difference between a model average estimate over the first portion of generated predicted target sequences and an empirical average estimate over the corresponding first portion of training target sequences; and
  combining a CE-based gradient update over the corresponding first portion of training source sequences with the determined score.

19. The method of claim 1, wherein said updating comprises selecting a portion of the plurality of training source sequences and the corresponding plurality of training target sequences;
  wherein said generating a plurality of predicted target sequences comprises generating a random sample of J corresponding predicted target sequences y: $y_1$, $y_2, \ldots, y_K$ using the neural seq2seq model for each of the training source sequences in the selected portion, where J is at least two;
  wherein said updating further comprises:
    computing, by the processor:
      a model average estimate based on a mathematical representation of the one or more global or semantic features or constraints, each of the model average estimates being computed over a respective subset of the J predicted target sequences;
      an empirical average estimate based on the mathematical representation of the one or more predefined global or semantic features or constraints over a distribution of the selected portion of training target sequences; and
      an unbiased estimate of a moment matching gradient over the J predicted target sequences based at least on the model average estimate and the empirical average estimate;
    computing, by the processor, a total moment matching gradient over the selected portion of the plurality of training source sequences and the corresponding plurality of training target sequences based on the unbiased estimate of the moment matching gradient computed for each of the training sequences in the selected portion; and
    updating the one or more model parameters according to the computed total moment matching gradient.

20. The method of claim 19,
  wherein said computing the unbiased estimate of the moment matching gradient over the J predicted target sequences comprises, for each predicted target sequence $y_j$ in $y_1, y_2, \ldots, y_K$:
    comparing the model average estimate computed for that predicted target sequence to the computed empirical average estimate; and
    computing a stochastic gradient using the predicted target sequence $y_j$;
  wherein, for each predicted target sequence $y_j$ in $y_1$, $y_2, \ldots, y_K$ the respective subset of the J predicted target sequences from which the model average estimate is computed excludes the predicted target sequence $y_j$.

21. A method for training a pretrained neural sequence-to-sequence (seq2seq) model using a processor, the neural seq2seq model being configured to receive an input source sequence and output a predicted target sequence based on one or more model parameters, the method comprising:
  receiving, by the processor, the pretrained neural seq2seq model and stored parallel training data, the stored parallel training data comprising a plurality of training source sequences and a corresponding plurality of training target sequences;
  performing, by the processor, for each of a plurality of iterations 1, . . . , M:
    selecting a batch of the plurality of training source sequences and corresponding training target sequences;
    randomly sampling a plurality of generated predicted target sequences for the selected batch of source sequences using the pretrained neural seq2seq model (for iteration 1) or using a model updated in a preceding iteration (for iterations 2, . . . , M);

in each of a first set of iterations between 1 and M:

computing, by the processor, total moment matching gradients over the selected batch using the randomly sampled plurality of generated predicted target sequences and the selected batch of corresponding training target sequences, wherein said computing comprises determining a distance between expectations of one or more predefined global or semantic features or constraints over the randomly sampled plurality of generated predicted target sequences and over the selected batch of corresponding training target sequences, the one or more predefined global or semantic features or constraints being represented by one or more conditional feature functions; and first updating, by the processor, the model parameters for the selected batch using gradient descent (GD) based on the computed total moment matching gradients to update the neural seq2seq model; and in each of a second set of iterations between 1 and M alternating with said first set of iterations:

computing, by the processor, cross-entropy-based (CE-based) based gradients for the selected batch using the randomly sampled plurality of generated predicted target sequences and the selected batch of corresponding training target sequences; and second updating, by the processor, the model parameters for the selected batch using gradient descent (GD) based on the computed CE-based gradients to update the pretrained neural seq2seq model; and saving in a memory updated model parameters for the pretrained neural seq2seq model from said first updating and second updating updated model parameters with respect to a best score to provide a trained neuralseq2seq model.

22. A method for generating a target sequence from a source sequence, comprising:

receiving the source sequence;

accessing in a memory a trained neural sequence-to-sequence model configured to receive the received source sequence and output the target sequence based on one or more model parameters;

generating the target sequence corresponding to the received source sequence using the trained neural sequence-to-sequence model; and outputting the generated target sequence;

wherein the trained neural sequence-to-sequence model is trained using a processor that:

receives a neural sequence-to-sequence (seq2seq) model and training data, the training data comprising a plurality of training source sequences and a corresponding plurality of training target sequences;

generates, using the neural seq2seq model, a plurality of predicted target sequences corresponding to the plurality of training source sequences;

updates the one or more model parameters based on a comparison of the generated plurality of predicted target sequences to the corresponding plurality of training target sequences to reduce or minimize a local loss in the predicted target sequences and to minimize or reduce a distance between an expectation of one or more predefined global or semantic features or constraints in the predicted target sequences and an expectation of the one or more predefined global or semantic features or constraints in the training target sequences given the training source sequences; and saves in the memory the one or more updated model parameters for the neural seq2seq model to provide the trained neural sequence-to-sequence model.

23. The method of claim 22, wherein the neural seq2seq model comprises a conditional model that comprises one or more of a neural machine translation model, a captioning model, and a summarization model.

24. The method of claim 22, wherein the one or more model parameters comprise weights input to nodes of the neural seq2seq model.

* * * * *